(12) United States Patent
Lahti et al.

(10) Patent No.: US 11,465,622 B2
(45) Date of Patent: Oct. 11, 2022

(54) PREDICTIVE ADAPTIVE CRUISE CONTROL

(71) Applicant: PACCAR Inc, Bellevue, WA (US)

(72) Inventors: John Lahti, Anacortes, WA (US); Christopher S. Balton, Bellingham, WA (US); Alexander E. Schramm, Modena (IT); Charles Wayne Reinhardt Swart, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 146 days.

(21) Appl. No.: 16/740,017

(22) Filed: Jan. 10, 2020

(65) Prior Publication Data
US 2021/0213948 A1 Jul. 15, 2021

(51) Int. Cl.
*B60W 30/14* (2006.01)
*B60W 30/16* (2020.01)
*B60W 30/18* (2012.01)
*G08G 1/00* (2006.01)

(52) U.S. Cl.
CPC ........ *B60W 30/146* (2013.01); *B60W 30/162* (2013.01); *B60W 30/18072* (2013.01); *G08G 1/22* (2013.01); *B60W 30/18127* (2013.01); *B60W 2552/15* (2020.02); *B60W 2556/65* (2020.02); *B60W 2710/06* (2013.01); *B60W 2710/1005* (2013.01); *B60W 2710/18* (2013.01); *B60W 2720/10* (2013.01)

(58) Field of Classification Search
CPC ...... B60W 2050/008; B60W 2050/048; G08G 1/22
See application file for complete search history.

(56) References Cited

U.S. PATENT DOCUMENTS

| | | | |
|---|---|---|---|
| 10,252,721 B1* | 4/2019 | Bai | G08G 1/22 |
| 2018/0265090 A1 | 9/2018 | Sharma et al. | |
| 2019/0025857 A1* | 1/2019 | Luckevich | G05D 1/0295 |
| 2020/0108829 A1* | 4/2020 | Bauer | B60W 50/00 |

FOREIGN PATENT DOCUMENTS

WO 2015/047177 A1 4/2015

OTHER PUBLICATIONS

International Search Report and Written Report, dated Apr. 20, 2021, for International Application No. PCT/US2021/012722, 14 pages.

* cited by examiner

*Primary Examiner* — Imran K Mustafa
(74) *Attorney, Agent, or Firm* — Seed IP Law Group LLP

(57) ABSTRACT

Systems and methods for predictive adaptive cruise control of a plurality of vehicles traveling in succession. A system engages in a vehicle-to-vehicle communication session with one or more vehicles of the plurality of vehicles. During the communication session, terrain information is obtained and first speed trajectory information is determined for an upcoming segment of road. Second speed trajectory information is received from a first adjacent vehicle of the plurality of vehicles. Third speed trajectory information is generated based on the second speed trajectory information received and the terrain information. The operation of the vehicle is controlled during the upcoming segment according to the third speed trajectory information.

18 Claims, 8 Drawing Sheets

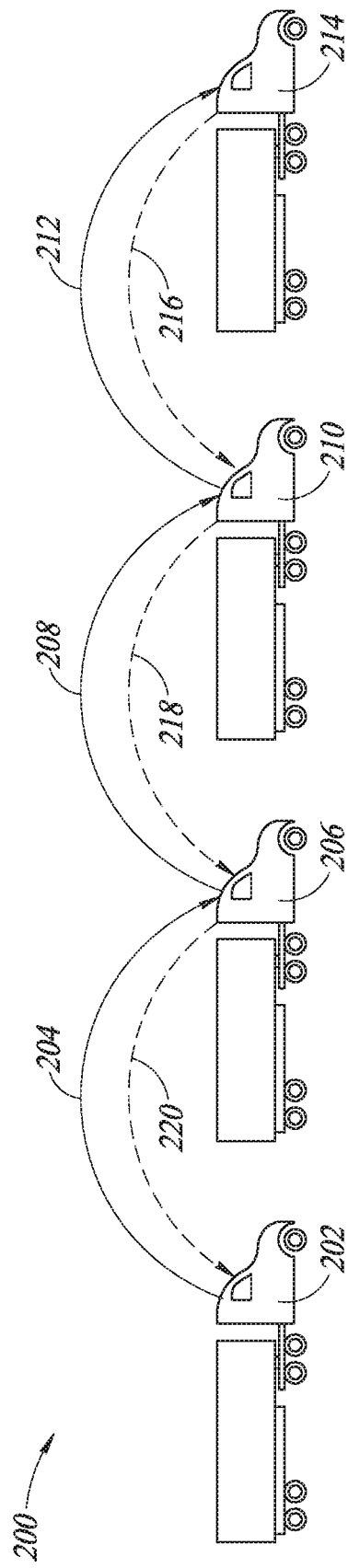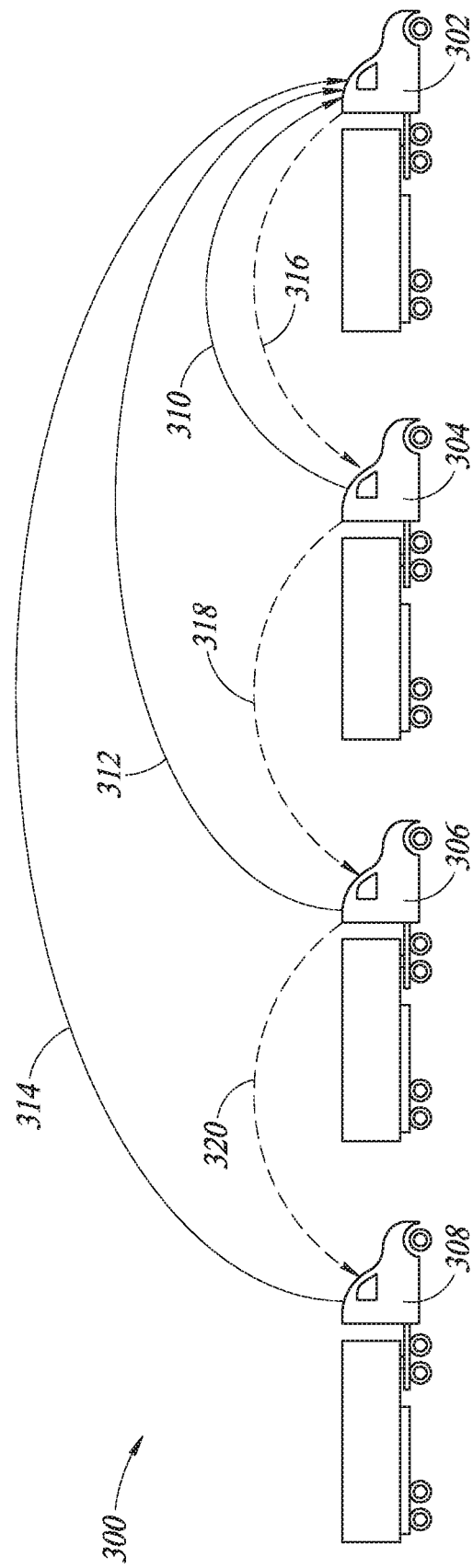

PREDICTIVE ADAPTIVE CRUISE CONTROL

BACKGROUND

Technical Field

The present disclosure relates to cruise control systems for controlling operational aspects of motor vehicles relative to other vehicles and road conditions.

Description of the Related Art

Traditional cruise control systems are operable to control the speed of a vehicle at or around a set speed based on input from a driver, which can help to improve operational efficiency of the vehicle and reduce driver fatigue. Several different types of cruise control systems have been developed that modify operation of a vehicle based on various factors. One type of cruise control is adaptive cruise control, in which a cruise control system of a vehicle may obtain distance measurements of the vehicle to a vehicle immediately ahead and reduce speed of the vehicle below the set speed to maintain a minimum following distance to the vehicle ahead. The adaptive cruise control system may increase the speed of the vehicle to or maintain the speed of the vehicle at the set speed when detected distance to the vehicle immediately ahead is greater than the minimum following distance. Adaptive cruise control may provide some level of vehicle autonomy so that operation of the vehicle is automatically adjusted without driver intervention in response to, for example, detection of a slower vehicle ahead.

Another type of cruise control is predictive cruise control, which can help to improve fuel efficiency of the vehicle. The phrase "predictive cruise control," as used herein, refers to a technique in which a cruise control system of a vehicle obtains information regarding the road ahead of the vehicle, and controls the speed of the vehicle based on the information obtained. Predictive cruise control systems attempt to maintain the vehicle at the set speed, but may allow the vehicle to travel at speeds other than the set speed for economic fuel consumption.

BRIEF SUMMARY

Briefly stated, embodiments disclosed herein are directed to systems and methods for predictive adaptive cruise control of a vehicle of a plurality of vehicles travelling as a platoon. A cruise control system of the vehicle engages in vehicle-to-vehicle communication with one or more of the plurality of vehicles travelling as a platoon. During the communication session, the cruise control system generates, transmits, and/or receives various speed trajectory information related to operation of the vehicle and other vehicles of the platoon along an upcoming segment of road.

Terrain information is obtained for the upcoming segment of road along which the plurality of vehicles is traveling. First speed trajectory information is generated for the vehicle and transmitted to a first vehicle of the plurality of vehicles. Subsequent to transmission of the first speed trajectory information, second speed trajectory information may be received from a first adjacent vehicle of the plurality of vehicles. Third speed trajectory information is generated based on the second speed trajectory information received and the terrain information. The cruise control system controls operation of the vehicles according to the third speed trajectory information during the upcoming segment of road. The third speed trajectory information may also be transmitted to a second adjacent vehicle of the plurality of vehicles.

The speed trajectory information may be generated according to an operational scheme that corresponds to features to be encountered in the upcoming segment of road. The predictive adaptive cruise control techniques disclosed herein may include determining an operational scheme for energy efficient operation of the vehicle along the upcoming segment of road based on the terrain information and the second speed trajectory information received from the first adjacent vehicle. Different operational schemes may be implemented based on different features of the upcoming segment of road or conditions detected along the segment of road.

The predictive adaptive cruise control techniques disclosed herein involve generating speed trajectory information for a vehicle based on speed trajectory information received from other vehicles in a vehicle platoon. In connection with generating predicted speed trajectory information, the cruise control system may project following distances of the vehicle to an adjacent vehicle in the platoon at positions along the upcoming segment of road as a factor in determining how the vehicle should operate along the upcoming segment. As a result of implementing the predictive adaptive cruise control techniques described herein, vehicles operating in a platoon may achieve both the efficiency benefits of predictive cruise control and the autonomy benefits of adaptive cruise control.

BRIEF DESCRIPTION OF THE SEVERAL VIEWS OF THE DRAWINGS

FIG. 2 is a first diagram of a plurality of vehicles performing a first predictive adaptive cruise control technique according to one or more embodiments;

FIG. 3 is a second diagram of a plurality of vehicles performing a second predictive adaptive cruise control technique according to one or more embodiments;

DETAILED DESCRIPTION

Figure 1:
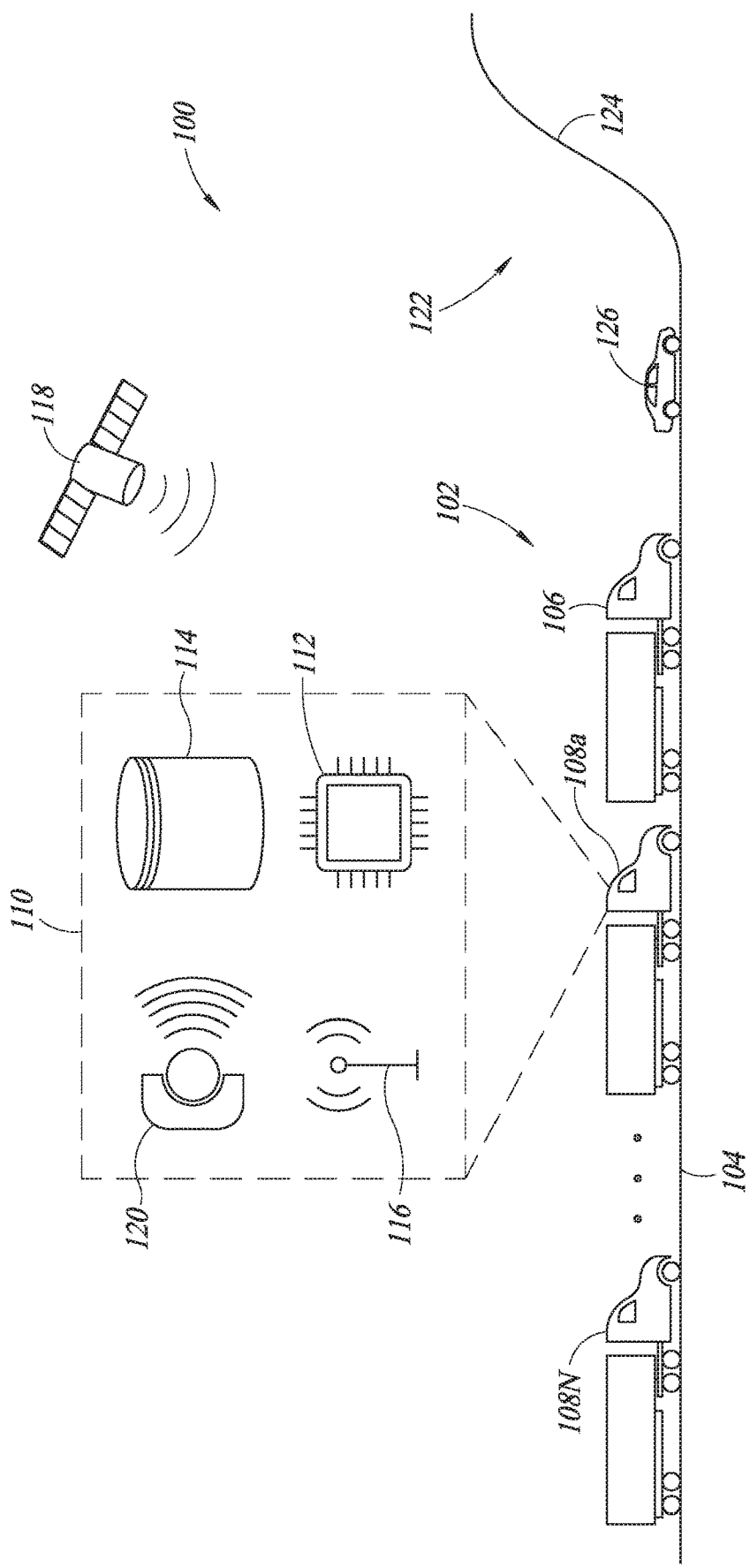
FIG. 1 is an environment in which a plurality of vehicles operate and implement predictive adaptive cruise control techniques according to one or more embodiments.

FIG. 1 shows an environment 100 in which a plurality of vehicles 102 are traveling as a platoon and each implementing predictive adaptive cruise control according to one or more embodiments. The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may include hardware embodiments, include software embodiments, or include embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Referring to FIG. 1, the plurality of vehicles 102 travelling as a platoon includes a lead vehicle 106 and one or more following vehicles 108a, . . . , 108N following the lead vehicle 106. Each of the following vehicles 108a, . . . , 108N travels along a road 104 in close succession with the vehicle ahead such that aerodynamic drag or wind resistance acting on the following vehicle is reduced relative to the aerodynamic drag the vehicle would experience if traveling alone. Such techniques to reduce drag or wind resistance are also known as drafting. The plurality of vehicles 102 wirelessly communicate with each other and exchange information regarding the vehicles and operation thereof. Each of the plurality of vehicles 102 includes a cruise control system 110 configured to implement predictive adaptive cruise control techniques, as disclosed herein, in which operation of the vehicles is controlled in view of speed trajectory information communicated between the vehicles and detected distances between the vehicles.

Although the adaptive cruise control and the predictive cruise control techniques described above each have benefits, it has been a significant challenge to design a cruise control system in which predictive and adaptive cruise control techniques are implemented to cooperatively achieve the benefits of both techniques. Moreover, for the plurality of vehicles 102 travelling as a platoon according to previously implemented solutions, exclusive implementation of either adaptive cruise control or predictive cruise control by one or more of the vehicles may adversely affect the benefit to other vehicles in the platoon of adaptive cruise control and/or predictive cruise control. For example, predictive cruise control techniques are typically disengaged in favor of adaptive cruise control systems when a vehicle is detected ahead that is below a minimum following distance. Under such adaptive cruise control techniques, the cruise control system operates the vehicle to maintain at least the minimum following distance to the vehicle ahead, which diminishes the opportunity of other vehicles in the plurality of vehicles 102 travelling as a platoon to receive the fuel efficiency benefits of predictive cruise control.

The cruise control system 110 disclosed herein implements predictive adaptive cruise control techniques in which features of predictive adaptive cruise control techniques cooperatively and in combination with features of adaptive cruise control techniques. The predictive adaptive cruise control techniques disclosed herein involve generating first speed trajectory information based on terrain information regarding an upcoming segment of road that the plurality of vehicles 102 will travel along. Following vehicles of the plurality of vehicles 102 transmit the first speed trajectory information to another vehicle of the plurality of vehicles 102. Each of the following vehicles of the plurality of vehicles 102 receives second speed trajectory information from a vehicle ahead and generates third speed trajectory information based on the second speed trajectory information received. The third speed trajectory information is generated based at least in part on desired following distances of the vehicle to an adjacent vehicle ahead at various positions along the upcoming segment.

As the plurality of vehicles 102 travel along the road, the speed trajectories of the plurality of vehicles 102 may be adjusted to account for deviations from previously generated speed trajectories. As a result of being implemented by cruise control systems 110 of the plurality of vehicles 102 travelling as a platoon, the predictive adaptive cruise control techniques described herein achieve benefits of predictive cruise control and adaptive cruise control to the vehicle platoon, as described herein. The predictive adaptive cruise control techniques described herein project, based on the terrain of the upcoming segment of road and the speed trajectory of the vehicle ahead, variation in following distances to the vehicle ahead in connection with generating the speed trajectory of the vehicle. The predictive adaptive cruise control techniques described herein also involve additional features and details that are distinguishable from previously-implemented cruise control techniques and which will be apparent to those skilled in the art.

The cruise control system 110 implementing the predictive adaptive cruise control techniques disclosed herein is a processor-based system, such as an embedded system, that includes one or more processors 112 that are communicatively coupled to control certain operations of the vehicle in which the cruise control system 110 is installed. The one or more processors 112 are part of or communicatively coupled to an electronic control unit of the vehicle to electronically control operational characteristics or parameters of the vehicle, such as engine power output, braking, and transmission gear, by way of non-limiting example. The one or more processors 112 are also communicatively coupled to receive measurements from sensors on the vehicle measuring operational characteristics of the vehicle, such as vehicle speed, crankshaft rotational speed, driveshaft rotational speed, transmission speed sensor, and brake pressure, also by way of non-limiting example.

The one or more processors 112 may include central processing units (CPU's), microcontrollers (MCU), digital signal processors (DSP), application specific integrated circuits (ASIC), and the like. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory. In some embodiments, some or all of the one or more processors 112 may be hardware specifically configured or hardwired to perform at least some of the operations described herein. For instance, the one or more processors 112 may include application specific integrated circuits (ASICs), field programmable gate arrays (FPGAs), system-on-a-chip (SoC), or other specialized or customizable computing hardware. In some embodiments, some or all of the one or more processors 112 may be part of a controller configured to interface with components on the vehicle and perform the operations described herein.

The cruise control system 110 also includes memory 114 communicatively coupled with the one or more processors for storing data, such as speed trajectory information described herein. The memory 114 comprises volatile computer-readable media (e.g., random-access memory) and/or non-volatile computer-readable media (e.g., read-only memory) for reading and writing data. The memory 114, in some embodiments, stores a set of instructions that, as a result of execution by the one or more processors 112, causes the cruise control system 110 to perform operations described herein.

The cruise control system 110 includes or is coupled to one or more communication interfaces 116 that enable the cruise control system 110 to wirelessly communicate with systems external to the vehicle. The communication interfaces 116 include one or more transceivers configured to send and receive electromagnetic signals according to one or more wireless communication protocols for wireless communications with other vehicles of the plurality of vehicles 102. The communication interfaces 116, for example, may include cellular communication devices, Wi-Fi® communication devices, Bluetooth® communication devices, and ZigBee® communication devices that are configured to operate according to corresponding communication protocols. The communication interfaces 116, in some embodiments, include a satellite communication device that is configured to communicate with satellites 118 in orbit around the Earth. The communication interfaces 116 may also communicate with ground-based antennas (not shown) of terrestrial communication systems. In some embodiments, the communication interface 116 may include a port or wireless interface for communicatively coupling with a mobile device (e.g., smart phone) of an occupant of the vehicle such that the cruise control system 110 is enabled to obtain information via a cellular or other wireless network to which the mobile device is connected.

The cruise control system 110 further includes or is coupled with one or more sensors 120 that are configured to measure distance to adjacent vehicles or objects around the vehicle. In particular, the one or more sensors 120 are positioned and configured to measure a distance to an adjacent vehicle ahead of the vehicle in which the cruise control system 110 is installed. The one or more sensors 120 may also be positioned and configured to measure a distance to adjacent vehicle behind the vehicle in which the cruise control system 110 is installed. Non-limiting examples of the one or more sensors 120 include radar sensors, light detection and ranging sensors (LIDAR), laser rangefinders, and sonar sensors. The one or more processors 112 receive measurements from the one or more sensors 120 and control operation of the vehicle based on the measurements.

The cruise control system 110 obtains information regarding an upcoming segment 122 of the road 104 for a route along which the vehicle is traveling. The cruise control system 110 determines the upcoming segment 122 of the road 104 in connection with identifying a location of the vehicle. The cruise control system 110 may identify the location of the vehicle based on location information received from external systems and/or measurements received from sensors onboard the vehicle. The cruise control system 110 may, for instance, obtain location information indicating a position of the vehicle and may obtain route information regarding a route along which the vehicle is traveling to reach a destination. The cruise control system 110 further obtains terrain information indicating features of the route along which the vehicle is traveling, including features of the upcoming segment 122 of the road 104. The cruise control system 110 may also obtain information regarding operational characteristics of the vehicle, such as vehicle speed, crankshaft rotational speed, driveshaft rotational speed, transmission speed sensor, and brake pressure, also by way of non-limiting example. The information regarding operational characteristics may be obtained from a control unit of the vehicle, such as an engine control unit or an electronic control unit, which may be a part of or separate from the cruise control system 110.

The location information may obtained via communication with terrestrial and/or non-terrestrial systems. Location information may include information received from orbiting satellites, such as Global Positioning System (GPS) satellites, Global Navigation Satellite System (GLONASS), Galileo satellites, and BeiDou Navigation Satellites, by way of non-limiting example. The location information may also include information received from Satellite-based augmentation systems (e.g., European Geostationary Navigation Overlay Service (EGNOS), GPS-aided GEO augmented navigation (GAGAN), Wide Area Augmentation System (WAAS)), and Ground-Based Augmentation Systems (GBAS). The location information may be obtained via a receiver onboard the vehicle, such as a GPS Receiver associated with the vehicle, or information received via communications with other vehicles or ground-based networks (e.g., mesh networks, cellular communication networks). The cruise control systems 110 may also determine a location or an orientation of the vehicle using onboard sensors, such as gyroscopes, accelerometers, magnetic field sensors, light sensors, also by way of non-limiting example.

The terrain information obtained by the cruise control system 110 includes or is usable to determine information regarding characteristics of the upcoming segment 122 of the road 104. The terrain information for the upcoming segment 122 indicates a grade 124 (e.g., incline grade, decline grade) of the upcoming segment 122 of the road 104. The cruise control system 110 may determine, based on the terrain information obtained, that the upcoming segment 122 includes an incline having a defined grade or a grade profile. The cruise control system 110 may determine or obtain information regarding slope or steepness for a plurality of positions along the upcoming segment 122 relative to a certain position along the road. The certain position may be, for example, a current position of the vehicle in which the cruise control system 110 is installed or a current position of the lead vehicle of the plurality of vehicles 102. For example, the cruise control system 110 may determine that the upcoming segment 122 has a first slope at a first distance from the certain position of the vehicle on the road 104, and determine that the upcoming segment 122 has a second slope at a second distance from the certain position of the vehicle on the road 104. The terrain information may include or be usable to determine other information regarding other characteristics of the upcoming segment 122, such as curvature of the road 104, changes in speed limit, weather conditions (e.g., high wind, low visibility conditions), road conditions (e.g., black ice, rough road), or traffic conditions, also by way of non-limiting example.

The cruise control system 110 may obtain the terrain information via communication with an orbiting satellite 118 or a ground-based transceiver, such as a cellular base station or a radio tower. In some embodiments, the cruise control system 110 may obtain terrain information from a mobile device in the vehicle via the one or more communication interfaces 116. The cruise control system 110 may, in some implementations, obtain traffic information that indicates traffic conditions along the upcoming segment 122 or other portions of the road 104 or route along which the vehicle is to travel. In some embodiments, the terrain information may include information stored in the memory 114 that is accessed based on the location of the vehicle. For instance, information regarding a grade or a curvature of the upcoming segment 122 may be obtained from a data structure, such as a lookup table, based at least in part on a location of the vehicle. In some embodiments, information regarding the upcoming segment 122 may be determined based on imaging information obtained from a camera onboard the vehicle or based on information or measurements obtained by vehicles previously travelling along the upcoming segment 122.

The cruise control system 110 determines a following distance to an adjacent vehicle ahead based on measurements received from the one or more sensors 120. The cruise control system 110 may obtain a plurality of measurements over time to determine a speed of the adjacent vehicle relative to the speed of the vehicle on which the cruise control system 110 is installed. The cruise control system 110 of the lead vehicle 106 may determine a distance to a fellow vehicle 126 ahead of the lead vehicle 106. The fellow vehicle 126 is an adjacent vehicle ahead of the lead vehicle 106 that is not part of the plurality of vehicles 102. In particular, the fellow vehicle 126 is not considered to be part of the "platoon" as a result of not being included or engaged in the communication session established among the plurality of vehicles 102. Furthermore, the fellow vehicle 126 may be of a size and shape insufficient to provide a reduction in aerodynamic drag for the lead vehicle 106. In some embodiments, the information received from the one or more sensors 120 may include image information obtained by a camera or other imaging device. In such implementations, the cruise control system 110 or an intermediate system may process the image information to determine a distance to the adjacent vehicle ahead. Such implementations may be useful in situations where the fellow vehicle 126 is too far ahead of or insufficiently aligned with the lead vehicle 106 for at least some distance sensors to accurately or precisely measure distance to the fellow vehicle 126.

The cruise control system 110 uses the terrain information and may use the distance measurements to determine speed trajectory information to implement for the vehicle when traveling along the upcoming segment 122. The speed trajectory information may include a predicted maximum speed trajectory that the vehicle can travel along the upcoming segment 122. The predicted maximum speed trajectory may specify, for a plurality of positions or distances along the upcoming segment 122 relative to a certain position along the road, the maximum speed being a speed that the vehicle can travel given the terrain information and characteristics of the vehicle. The speed trajectory information determined by the cruise control system 110 also includes a predicted speed trajectory of the vehicle along the upcoming segment 122. The predicted speed trajectory specifies the predicted speed of the vehicle for a plurality of positions or distances along the upcoming segment 122 relative to a certain position or location given the terrain information and an operational scheme for operation of the vehicle, as described elsewhere herein. The predicted speed trajectory may also include predicted following distances to the adjacent vehicle ahead at given positions or distances along the upcoming segment 122.

At least some of the speed trajectory information may be communicated between cruise control systems 110 of the plurality of vehicles 102 according to one or more predictive adaptive cruise control techniques disclosed herein. Each cruise control system 110 may send at least some of the speed trajectory information generated to cruise control systems 110 of other vehicles of the plurality of vehicles 102. Further, each cruise control system 110 may generate speed trajectory information based on speed trajectory information received from other vehicles of the plurality vehicles 102. As described elsewhere herein, speed trajectory information may be generated by the cruise control systems 110 based on the terrain of the upcoming segment 122 of road 104 and following distances between vehicles of the platoon.

The predictive adaptive cruise control techniques disclosed herein and/or fellow vehicles that the plurality of vehicles 102 will encounter during the upcoming segment 122. The cruise control systems 110 of the plurality of vehicles 102 may determine which predictive adaptive cruise control technique disclosed herein to implement based on certain defined conditions, such as the number of vehicles in the plurality of vehicles 102.

Each of the plurality of vehicles in the plurality of vehicles 102 is considered to be part of a "platoon" as a result of being engaged in communication with other vehicles of the plurality of vehicles 102 according to the predictive adaptive cruise control techniques disclosed herein. By contrast, the fellow vehicle 126 and other vehicles not engaged in communication with other vehicles in the plurality of vehicles 102 according to the predictive adaptive cruise control techniques disclosed herein are not considered to be part of the "platoon." Therefore, although other vehicles may be near to, in front of, or behind individual vehicles of the plurality of vehicles 102, such fellow vehicles are not considered to be part of the plurality of vehicles 102 travelling as a platoon according to the predictive adaptive cruise control techniques disclosed herein.

FIG. 2 shows a diagram in which a plurality of vehicles traveling as a platoon 200 implement a first predictive adaptive cruise control technique. The cruise control systems 110 (FIG. 1) of the platoon 200 of vehicles generate speed trajectory information and may arbitrate speed trajectory information to be transmitted to a first adjacent vehicle of the platoon 200 based on speed trajectory information received from a second adjacent vehicle of the platoon 200. A cruise control system 110 of the last vehicle 202 of the platoon 200 generates speed trajectory information including predicted maximum speed trajectory information 204 of the last vehicle 202 for an upcoming segment of road. As described herein, predicted maximum speed trajectory information specifies, for each of a plurality of positions or distances along the upcoming segment of road relative to the certain position, a corresponding maximum speed that the vehicle can travel based on terrain and characteristics of the vehicle.

The cruise control system 110 of the last vehicle 202 may adjust the predicted maximum speed trajectory information 204 based on a following distance error to an adjacent vehicle ahead of the last vehicle 202. The cruise control system 110 may determine a following distance error corresponding to a difference between a desired following distance and the measured following distance. The desired following distance is, in some embodiments, a nominal platoon following distance stored in the memory 114 of each cruise control system 110 of the platoon, the nominal platoon following distance being a desired following distance that each vehicle should maintain to an adjacent vehicle ahead when traveling along a level segment of road that does not have a significant grade (e.g., a grade less than a defined absolute grade).

The nominal platoon following distance may be a greater following distance than a minimum following distance that would be maintained for an adaptive cruise control system. A first nominal platoon following distance for the following vehicles of the platoon may be different than a second nominal platoon following distance of a lead vehicle of the platoon to an adjacent fellow vehicle ahead. The second nominal platoon following distance may, for example, be a greater following distance then the first nominal platoon following distance to provide the platoon sufficient distance to safely reduce speed in the event that a hazard, slowing vehicle, etc., is detected ahead. However, in some embodiments the first nominal platoon following distance may be the same distance as the second nominal platoon following distance. A plurality of nominal platoon following distances may be stored in the memory 114, each of the plurality of nominal platoon following distances corresponding to a set of characteristics of a segment of the road, such as grade, weather conditions, and road curvature, by way of non-limiting example.

In some embodiments, the desired distance involved in determining the following distance error may correspond to a difference between the measured following distance and previously generated speed trajectory information for the vehicle. The cruise control system 110 of the last vehicle 202, for example, may be currently controlling operation of the last vehicle 202 based on previously generated speed trajectory information that specifies desired following distances to the adjacent vehicle ahead for positions along a previous segment and/or a current segment of the road—in this instance, desired following distances to a vehicle 206 adjacent to and ahead of the last vehicle 202 in the platoon 200. The cruise control system 110 of the last vehicle 202 may obtain, from one or more sensors, measurements indicating a distance between the last vehicle 202 and the vehicle 206. In such embodiments, the following distance error may correspond to the difference between the measured following distance and the following distance in the previously generated speed trajectory information for a position along the current road segment.

Following distance error may be determined based on a metric appropriate to determine error between the measured following distances and desired following distances. Such metrics for error include root mean squared error, mean absolute error, or percentage error, by way of non-limiting example. The cruise control system may adjust the predicted maximum speed trajectory information 204 based on the following distance error determined. For example, the speed profile of maximum speeds in the predicted maximum speed trajectory information 204 may be shifted in position (e.g., closer or farther along the upcoming segment) by a certain amount or distance corresponding to the following distance error. The cruise control system 110 of the last vehicle 202 transmits the predicted maximum speed trajectory information 204 (which information may be adjusted for following distance error) to the vehicle 206.

The cruise control system 110 of the vehicle 206 also generates speed trajectory information that includes predicted maximum speed trajectory information of the vehicle 206 for the upcoming segment of road. The vehicle 206 receives the predicted maximum speed trajectory information 204 from the last vehicle 202. The cruise control system 110 of the vehicle 206 determines, based on a defined criterion, predicted maximum speed trajectory information to be transmitted ahead to the next adjacent vehicle from among the predicted maximum speed trajectory information 204 and the predicted maximum speed trajectory information generated by the vehicle 206. In particular, the cruise control system 110 of the vehicle 206 selects, for each position or distance along the upcoming segment of road, a minimum speed from among the predicted maximum speed trajectory information 204 and the predicted maximum speed trajectory information generated by the cruise control system 110 of the vehicle 206. For example, for a first position along the upcoming segment (e.g., 20 meters along the upcoming segment) specified in each set of predicted maximum speed trajectory information, the cruise control system selects the lowest speed between the maximum speed determined for the first position by the last vehicle 202 and the maximum speed determined for the first position by the vehicle 206.

In this example, the cruise control system 110 of the vehicle 206 compiles the minimum speeds determined for each position or distance along the upcoming segment into first arbitrated speed trajectory information 208. The cruise control system 110 of the vehicle 206 may adjust the first arbitrated speed trajectory information 208 based on a following distance error of the vehicle 206 to a vehicle 210 adjacent to and ahead of the vehicle 206 in the platoon 200, as described above with respect to the last vehicle 202 and elsewhere herein. The cruise control system 110 of the vehicle 206 then transmits the first arbitrated speed trajectory information 208 (which may be adjusted based on following distance error) to the vehicle 210 ahead.

The cruise control system 110 of the vehicle 210 also generates speed trajectory information that includes predicted maximum speed trajectory information of the vehicle 210 for the upcoming segment of road and receives the first arbitrated speed trajectory information 208 from the vehicle 206. The cruise control system 110 of the vehicle 210 determines predicted maximum speed trajectory information to be transmitted ahead to the next adjacent vehicle based on the same defined criterion. In particular, the cruise control system 110 selects, for each position or distance along the upcoming segment, a minimum speed from among the first arbitrated speed trajectory information 208 and the predicted maximum speed trajectory information generated by the cruise control system 110 of the vehicle 210. The cruise control system 110 of the vehicle 210 compiles the minimum speeds determined for each position into second arbitrated speed trajectory information 212, which the cruise control system transmits to the next adjacent vehicle. The cruise control system 110 of the vehicle 210 may adjust the second arbitrated speed trajectory information 212 based on following distance error of the vehicle 210 to an adjacent vehicle ahead.

This process of arbitrating predicted maximum speeds and transmitting the compiled arbitrated speeds to the next adjacent vehicle is iterated until the arbitrated information is received by a lead vehicle 214 of the platoon. The cruise control system 110 of the lead vehicle 214 generates predicted maximum speed trajectory information of the lead vehicle 214 for the upcoming segment of road. The lead vehicle 214 receives the arbitrated speed trajectory information from the adjacent following vehicle—in this case, the second arbitrated speed trajectory information 212 received by the lead vehicle 214 from the vehicle 210—and determines arbitrated speed trajectory information based on the defined criterion.

The cruise control system 110 of the lead vehicle 214 generates predicted speed trajectory information 216 to be implemented by the lead vehicle 214 during the upcoming segment of road. In particular, the predicted speed trajectory information 216 indicates a speed profile and may indicate a following distance profile for the lead vehicle 214 during the upcoming segment. The speed profile specifies speeds at which the lead vehicle 214 is predicted to travel for each defined position along the upcoming segment of road. The following distance profile specifies predicted following distances to an adjacent fellow vehicle ahead, if any, for each defined position along the upcoming segment. The predicted speed trajectory information 216 may be constrained by the arbitrated speed trajectory information received from the adjacent vehicle behind (the second arbitrated speed trajectory information 212). In particular, the operation of the lead vehicle 214 according to the predicted speed trajectory information 216 for each position along the upcoming segment of road are constrained by the arbitrated speed trajectory information such that the speeds will not cause the lead vehicle 214 to exceed the maximum speed specified in the arbitrated speed trajectory information for the corresponding position along the upcoming segment.

The predicted speed trajectory information 216 may further be determined based on information obtained regarding terrain of the upcoming segment of road, such as incline grades and decline grades, as well as traffic conditions (e.g., slower fellow vehicles) to be encountered during the upcoming segment. The predicted speed trajectory information 216 may further include a following distance profile specifying predicted following distances of the lead vehicle 214 to an adjacent fellow vehicle ahead (i.e., an adjacent vehicle ahead that is not included in the platoon 200). To achieve the speeds and following distances specified, the predicted speed trajectory information 216 may also include information specifying operational characteristics of the lead vehicle 214 at positions along the upcoming segment of road relative to a certain position. Non-limiting examples of such operational characteristics include wheel torque, engine power output, engine retarder torque, and transmission gear. The cruise control system 110 of the lead vehicle 214 than transmits the predicted speed trajectory information 216 to an adjacent vehicle behind the vehicle 214—in this case, to the vehicle 210.

The cruise control system 110 of the vehicle 210 determines predicted speed trajectory information 218 of the vehicle 210 for the upcoming segment of road. The cruise control system may, for example, determine a following distance profile specifying predicted following distances of the vehicle 210 to the lead vehicle 214 based on the predicted speed trajectory information 216 received from the lead vehicle 214 and based on the terrain information for the upcoming segment of road. The predicted speed trajectory information 218 (and predicted speed trajectory information generated by the remaining cruise control systems 110 of the other following vehicles of the platoon 200) may specify values for operational characteristics of the vehicle 210 at positions along the upcoming segment of road relative to a certain position of the vehicle 210 or of the lead vehicle 214. The cruise control system may determine a speed profile specifying predicted speeds of the vehicle 210 at positions along the upcoming segment. The speed profile may be determined based on speeds that achieve the following distances of the vehicle 210 to the lead vehicle 214 for the positions along the upcoming segment. The following distances of the vehicle 210 to the lead vehicle 214 specified in the following distance profile may vary along the upcoming segment based on the terrain and traffic conditions that will be encountered.

The predicted speed trajectory information 218 may be constrained according to a minimum following distance of the vehicle 210 to the lead vehicle 214. For instance, the cruise control system 110 of the vehicle 210 may be configured to generate a following distance profile that does not include a following distance less than a defined minimum following distance to the adjacent vehicle ahead (e.g., the lead vehicle 214) to mitigate or reduce the risk of collision of the following vehicle with the adjacent vehicle ahead. The defined minimum following distance of the vehicle 210, in some embodiments, may be specific to the vehicle 210 based on, e.g., weight of the vehicle 210 and a load towed thereby, engine retarder torque, weather conditions, and/or brake system configuration. It is noted that the defined minimum following distance is distinguishable from the defined following distance discussed with respect to FIG. 7 and elsewhere.

The cruise control system 110 of the vehicle 210 transmits the predicted speed trajectory information 218 to the adjacent vehicle behind the vehicle 210—in this case, the vehicle 206. The cruise control system 110 of each successive following vehicle generates and predicted speed trajectory information to the rearwardly adjacent vehicle in the platoon 200 until no additional rearwardly adjacent vehicles of the platoon 200 exist. The cruise control system 110 of the last vehicle 202 of the platoon 200 generates predicted speed trajectory information based on predicted speed trajectory information 220 received from the vehicle 206 ahead.

During the upcoming segment of road, the cruise control systems 110 of each vehicle of the platoon 200 control operation of the vehicle in which they are installed based on the predicted speed trajectory information for the respective vehicle. For example, the cruise control system 110 of the lead vehicle 214 operates the lead vehicle 214 according to the predicted speed trajectory information 216 during the upcoming segment, the cruise control system 110 of the vehicle 210 operates the vehicle 210 according to the predicted speed trajectory information 218, and so forth. The cruise control systems 110 of the vehicles of the platoon 200 may iteratively update the predicted speed trajectory information during or while approaching the upcoming segment of road to correct errors, such as following distance error, or respond to changes in road or traffic conditions, such as speed changes by fellow vehicles that are not part of the platoon 200.

FIG. 3 shows a diagram in which a plurality of vehicles traveling as a platoon 300 implement a second predictive adaptive cruise control technique. The cruise control systems 110 of the platoon 300 of vehicles generate first speed trajectory information that is transmitted to a lead vehicle of the platoon 300, and generate second speed trajectory information based on speed trajectory information received from an adjacent vehicle of the platoon 300. The platoon 300 includes a lead vehicle 302 and a number of following vehicles 304, 306, 308, etc., following the lead vehicle 302 in succession. Although three following vehicles are shown and described herein as following the lead vehicle 302 in FIG. 3, the number of following vehicles may vary without departing from the scope of the present disclosure.

Each cruise control system 110 of the following vehicles in the platoon 300 generates predicted maximum speed trajectory information of the associated vehicle for an upcoming segment of road. The predicted maximum speed trajectory information corresponds to that described above with respect to FIG. 2 and elsewhere herein. Each of the following vehicles of the platoon 300 transmits the predicted maximum speed trajectory information to the lead vehicle 302. The cruise control systems 110 of each of the following vehicles 304, 306, 308, etc., of the platoon 300 may operate independently of the other cruise control systems 110 of the other following vehicles of the platoon 300 to generate and transmit predicted maximum speed trajectory information for the respective vehicle.

The cruise control system 110 of the following vehicle 304 adjacent to and behind the lead vehicle 302 generates predicted maximum speed trajectory information 310 and transmits the predicted maximum speed trajectory information 310 to the lead vehicle 302. The cruise control system 110 of the following vehicle 306 adjacent to and behind the following vehicle 304 generates predicted maximum speed trajectory information 312 of the following vehicle for the upcoming segment of road, and transmits the predicted maximum speed trajectory information 312 to the lead vehicle 302. Similarly, the cruise control system 110 of the following vehicle 308 adjacent to and behind the following vehicle 306 generates and transmits predicted maximum speed trajectory information 314 to the lead vehicle 302.

The cruise control systems 110 of each of the following vehicles of the platoon 300 determine following distance error to an adjacent vehicle ahead. As described above with respect to FIG. 2 and elsewhere herein, the cruise control system 110 of each of the vehicles in the platoon 300 may determine a following distance error for the vehicle based on a difference between the desired following distance and a measured following distance. In some implementations, the desired following distance may be a nominal platoon following distance of a vehicle to an adjacent vehicle ahead that is defined in the memory 114 of the cruise control system 110.

In some implementations, the desired following distance is a following distance included in previously generated speed trajectory information. As an example, the cruise control system 110 may be currently controlling operation of the vehicles based on previously generated speed trajectory information that specifies a set of desired following distances to the adjacent vehicle ahead for a set of positions along a previous segment and/or a current segment of the road. Each cruise control system 110 may obtain a set of measurements from one or more sensors indicating a distance between the vehicle of the cruise control system 110 and an adjacent vehicle ahead. The cruise control system 110 determines following distance error for the vehicle based on one or more differences between the set of desired following distances and the set of measure distances. The following distance error may correspond to percentage error, absolute mean error, mean squared error, or other metrics for error based on one or more differences between the set of desired following distances and the set of distance measurements. Each cruise control system 110 of the following vehicles 304, 306, 308, etc., transmits following distance error information (if any such following distance error exists) for the associated vehicle in connection with the predicted maximum speed trajectory information to the lead vehicle 302.

The lead vehicle 302 receives the predicted maximum speed trajectory information 310, 312, 314, etc., and the following distance error (if any) from the following vehicles 304, 306, 308, etc. The cruise control system 110 of the lead vehicle 302 adjusts the predicted maximum speed trajectory information 310, 312, 314, etc., based on the following distance error information for the respective following vehicles, 306, 308, etc. For example, the cruise control system 110 of the lead vehicle 302 may shift the speed profile of maximum speeds in the predicted maximum speed trajectory information 310 by a distance or number of positions corresponding to the following distance error.

The lead vehicle 302 then determines an arbitrated maximum speed trajectory from among the predicted maximum speed trajectory information 310, 312, 314, etc., based on a defined criterion. In particular, the cruise control system 110 of the lead vehicle 302 selects, for each position or distance along the upcoming segment, a minimum speed from among the predicted maximum speed trajectory information 310, 312, 314, etc. As an example, the predicted maximum speed trajectory information 310 may specify a first maximum speed value for a first position along the upcoming segment of road, the predicted maximum speed trajectory information 312 may specify a second maximum speed value for the first position, and the predicted maximum speed trajectory information 314 may specify a third maximum speed value for the first position. The cruise control system 110 of the lead vehicle 302 may select, as the arbitrated speed value for the first position, a minimum speed value from among the first speed value, the second speed value, and the third speed value. The cruise control system 110 selects the minimum value from the predicted maximum speed trajectory information of the following vehicles for each position along the upcoming segment of road.

The cruise control system 110 of the lead vehicle 302 then generates predicted speed trajectory information 316 of the lead vehicle 302 for the upcoming segment of road, as described above with respect to the first predictive adaptive cruise control technique described with respect to FIG. 2 and elsewhere herein. For example, the predicted speed trajectory information may include a speed profile specifying speeds of the lead vehicle 302 at positions along the upcoming segment relative to a certain position of the lead vehicle 302. The predicted speed trajectory information 316 may include a following distance profile of the lead vehicle 302 to an adjacent fellow vehicle ahead, if any such fellow vehicle is detected. The predicted speed trajectory information 316 may indicate values for operational characteristics of the lead vehicle 302 that the cruise control system 110 determines will achieve the speed profile and/or following distance profile for the upcoming segment. Non-limiting examples of such operational parameters include engine power output, transmission gear, and wheel torque. The speeds specified in the predicted speed trajectory information 316 for positions along the upcoming segment of road are constrained by the arbitrated maximum speed trajectory determined by the lead vehicle 302. In particular, the speeds specified in the predicted speed trajectory information will not cause the lead vehicle to exceed the arbitrated speed values selected for the corresponding positions along the upcoming segment of road. The cruise control system 110 of the lead vehicle 302 transmits the predicted speed trajectory information 316 to an adjacent vehicle behind the lead vehicle 302, which is the following vehicle 304 in this case.

The cruise control system 110 of the following vehicle 304 receives the predicted speed trajectory information 316 from the lead vehicle 302. The cruise control system 110 of the following vehicle 304 generates, based on the predicted speed trajectory information 316 received, predicted speed trajectory information 318 of the following vehicle 304 for the upcoming segment of road, as described with respect to generation of the predicted speed trajectory information 218 of FIG. 2 and elsewhere herein. The predicted speed trajectory information 318 may include a speed profile and/or a following distance profile of the following vehicle 304 for the upcoming segment of road. The predicted speed trajectory information 318 (and predicted speed trajectory information generated by the cruise control systems 110 of the remaining following vehicles of the platoon 300) may specify operational characteristics of the following vehicle 304 at positions along the upcoming segment of road relative to a certain position of the following vehicle 304 or of the lead vehicle 302.

The predicted speed trajectory information 318 may be constrained according to a defined minimum following distance for the following vehicle 304, as described with respect to the predicted speed trajectory information 218 of FIG. 2 and elsewhere herein. For instance, a programmed constraint of the cruise control system 110 may specify that the following distances of the following distance profile cannot be smaller than a minimum following distance specifically defined for the following vehicle 304 or defined for the vehicles of the platoon 300. The cruise control system 110 of the following vehicle 304 transmits the predicted speed trajectory information 318 to the following vehicle 306 adjacent to and behind the following vehicle 304. The cruise control system 110 of each successive following vehicle generates predicted speed trajectory information based on the predicted speed trajectory information received from the adjacent vehicle ahead. The predicted speed trajectory information generated by the cruise control system 110 of each successive following vehicle may be constrained by a defined minimum following distance, as described elsewhere herein. The cruise control system 110 of each successive following vehicle generates and transmits predicted speed trajectory information to the rearwardly adjacent vehicle in the platoon 300 until no additional rearwardly adjacent vehicles of the platoon 300 exist. The cruise control system 110 of the last following vehicle 308 generates predicted speed trajectory information based on predicted speed trajectory information 320 from the vehicle 306 ahead.

During the upcoming segment of road, the cruise control systems 110 of each vehicle of the platoon 300 control operation of the vehicle in which they are installed based on the predicted speed trajectory information for the respective vehicle. The cruise control systems 110 of the vehicles of the platoon 300 may iteratively update the predicted speed trajectory information during or while approaching the upcoming segment of road to correct errors or respond to changes in conditions. Features of the second predictive adaptive cruise control technique may be substantially similar to the features of the first predictive adaptive cruise control technique described with respect to FIG. 2 so further description thereof is omitted for brevity.

Figure 4A:
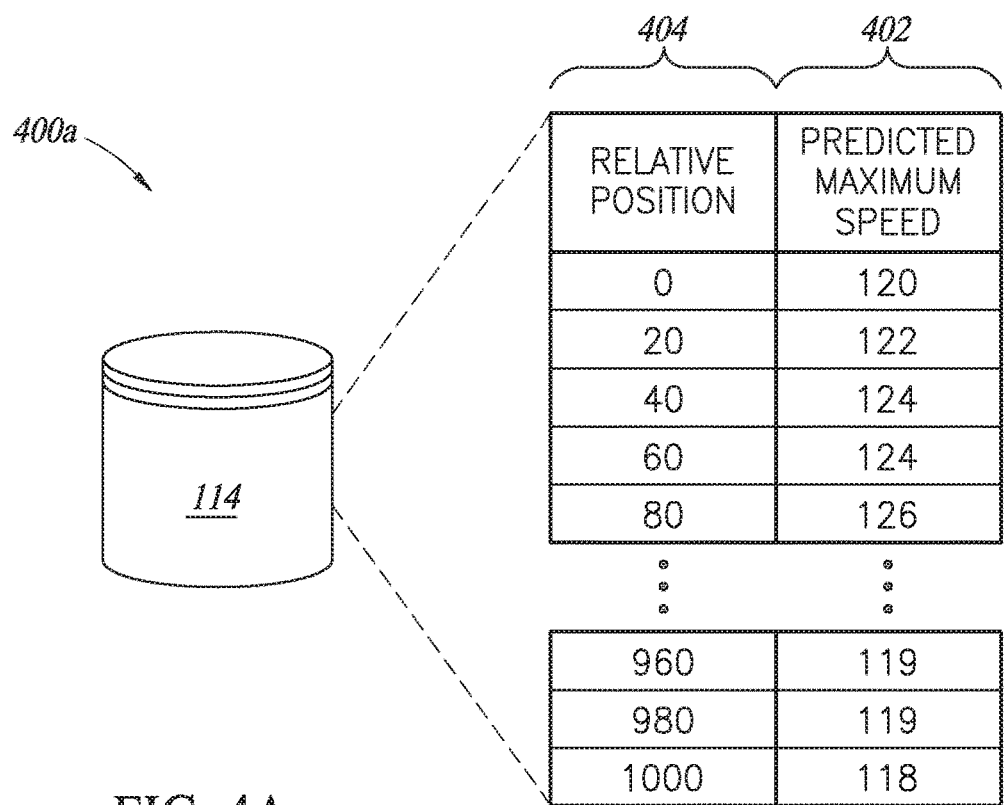
FIG. 4A is a first data array of speed trajectory information used in connection with predictive adaptive cruise control techniques according to one or more embodiments.

FIG. 4A shows an example of predicted maximum speed trajectory information 400*a* generated by the cruise control system 110 performing a predictive adaptive cruise control technique for controlling a vehicle according to one or more embodiments described herein. The predicted maximum speed trajectory information 400*a* is a data array generated by the cruise control system 110 of a vehicle traveling in a platoon and stored in the memory 114. The predicted maximum speed trajectory information 400*a* specifies predicted or estimated maximum speeds 402 at which the vehicle of the cruise control system 110 is capable of traveling during the upcoming segment of road. The values of the predicted maximum speeds 402 are in an appropriate unit of speed, such as kilometers per hour, miles per hour, or meters per second.

The predicted maximum speeds 402 of the vehicle are defined for a plurality of corresponding positions 404 along the upcoming segment of road relative to a reference position or location of the platoon along the road. The reference position or location may be a current or future position of the vehicle in which the cruise control system 110 is installed, or a current or future position of the lead vehicle of the platoon. The plurality of corresponding positions 404 shown in FIG. 4A indicate distance of the vehicle relative to the reference position. With reference to FIG. 4A, the predicted maximum speed of the vehicle is 122 (e.g., 122 kilometers per hour) for a relative position of 20 (e.g., 20 meters), the predicted maximum speed of the vehicle is 124 for relative position of 40, and so on. The predicted maximum speeds 402 may include a maximum speed for the reference position, which may be a current speed or a predicted maximum speed of the vehicle.

The relative positions 404 specified may be in any appropriate unit of distance measurement, such as meters, feet, kilometers, miles, and may be defined as a fraction or decimal of a distance measurement unit, such as tenths of a mile or tenths of a kilometer. In some embodiments, the relative positions 404 for which the predicted maximum speeds 402 are defined may be in a metric other than distance. For example, the relative positions 404 may specify future times (e.g., in seconds, time of day) relative to a reference time, which may be a current time or time in the near future. In some embodiments, the relative positions 404 may be location information representative of vehicle position, such as GPS coordinates, or distance along a road, by way of non-limiting example.

The predicted maximum speeds 402 are determined by the cruise control system 110 based on the terrain of the upcoming segment of road and may be based on characteristics of the vehicle. Such vehicle characteristics may include the current vehicle speed; the weight of the vehicle, including the weight of a load that the vehicle is towing; engine power characteristics; weather conditions; brake stopping power; engine retarder characteristics; aerodynamic load (e.g., drag); tire rolling resistance; and transmission gear, by way of non-limiting example. As an example, the cruise control system 110 may obtain terrain information regarding the upcoming segment and determine that, under maximum engine power output for the vehicle over a time period or distance given the upcoming terrain, the vehicle can achieve the predicted maximum speeds 402 at each corresponding position of the relative positions 404.

In connection with determining the predicted maximum speed trajectory information 400*a*, the cruise control system 110 may determine a following distance error of the vehicle to an adjacent vehicle ahead. As described elsewhere herein, the cruise control system 110 may determine following distance error based on a difference between a nominal platoon following distance and a measured following distance of the vehicle to the adjacent vehicle ahead. The cruise control system 110 may determine following distance error as a difference between a following distance in previously generated predicted speed trajectory information and measured distances for the vehicle.

The cruise control system 110 may obtain a set of measurements, from the one or more sensors 120, indicating distance of the vehicle to the adjacent vehicle ahead for the defined positions along the road. The cruise control system 110 may determine following distance error (if such error exists) based on difference or differences between one or more of the desired following distance(s) specified and the corresponding distance measurements. The cruise control system 110 may determine the following distance error based on an appropriate error metric, such as percentage error, mean squared error, etc. In some implementations, the cruise control system 110 may adjust the predicted maximum speeds 402 based on the following distance error, such as by adjusting some or all of the maximum speed values by a fixed amount to account for the following distance error.

The cruise control system 110 may utilize the predicted maximum speed trajectory information 400*a* according to the predictive adaptive cruise control technique being implemented. According to the first predictive adaptive cruise control technique described with respect to FIG. 2, the cruise control system 110 may adjust the predicted maximum speeds 402 based on the following distance error and determine arbitrated maximum speed trajectory information using the adjusted predicted maximum speed trajectory information 400*a* based on a defined constraint. According to the second predictive adaptive cruise control technique described with respect to FIG. 3, the cruise control system 110 may transmit the predicted maximum speed trajectory information 400*a* along with the following distance error, if any, to another vehicle of the platoon.

Figure 4B:
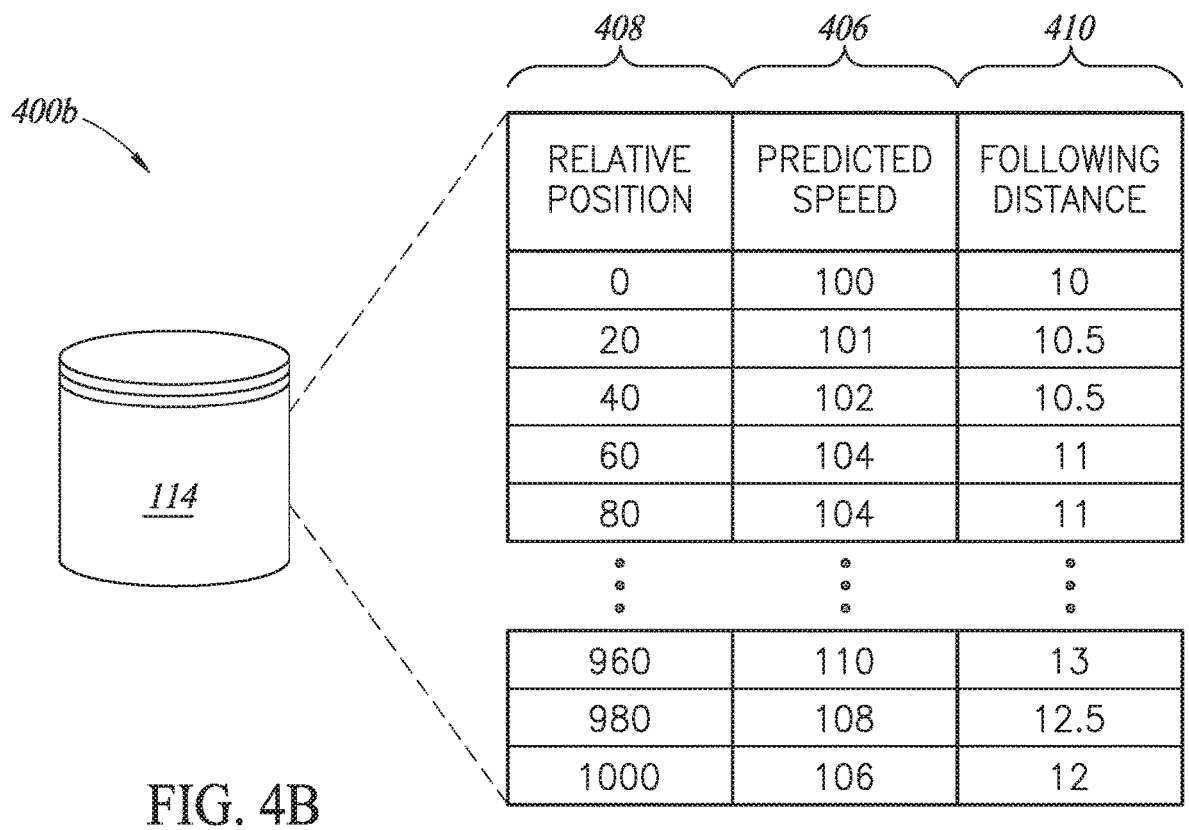
FIG. 4B is a second data array of speed trajectory information used in connection with predictive adaptive cruise control techniques according to one or more embodiments.

FIG. 4B shows an example of predicted speed trajectory information 400*b* generated by the cruise control system 110 performing a predictive adaptive cruise control technique for controlling the vehicle according to one or more embodiments described herein. The predicted speed trajectory information 400*b* is a data array generated by the cruise control system 110 of the vehicle traveling in a platoon and stored in the memory 114. The predicted speed trajectory information 400*b* is generated based on speed trajectory information received from another vehicle of the platoon and further based on terrain information regarding features of the upcoming segment of road. The predicted speed trajectory information 400*b* specifies predicted or estimated speeds 406 at which the vehicle of the cruise control system 110 will travel during the upcoming segment of road. The values of the predicted speeds 406 are in an appropriate unit of speed, such as kilometers per hour, miles per hour, or meters per second. The cruise control system 110 may determine, as part of or in connection with generating the predicted speed trajectory information 400*b*, a set of following distances 410 of the vehicle to an adjacent vehicle ahead.

The predicted speeds 406 and the following distances 410 of the vehicle are defined for a plurality of corresponding relative positions 408 along the upcoming segment of road relative to a reference position or location of the platoon along the road. The relative positions 408 may correspond to the relative positions 404 described above with respect to the predicted maximum speed trajectory information 400*a*. As described with respect to FIG. 4A, the relative positions 408 may be distances relative to a reference position (e.g., position of the vehicle, position of the platoon), may be future times relative to a reference time, or GPS coordinates. The predicted speeds 406 in relation to the relative positions 408 may be collectively considered as a speed profile of the vehicle for the upcoming segment. The following distances 410 in relation to the relative positions 408 may be collectively considered as a following distance profile of the vehicle for the upcoming segment.

Although not shown in FIG. 4B, the predicted speed trajectory information 400*b* generated by the cruise control system 110 may include or have associated therewith information indicating operational characteristics of the vehicle during the upcoming segment. The information regarding operational characteristics generated by the cruise control system 110 specifies operations to be performed to achieve the predicted speeds 406 and the following distances 410 for the positions 408. Non-limiting examples of the operational characteristics controlled by the cruise control system 110 include engine power output, brake system operation, engine retarder operation, transmission gear, and wheel torque. The operational characteristic information may be specified for at least some of the relative positions 408. The information may specify, for example, that at a first location along the upcoming segment, the cruise control system 110 should shift the transmission to a different gear. As another example, the information may specify that at a second location along the upcoming segment, the cruise control system 110 should increase the engine power output to a certain level. As further non-limiting examples, the information may specify that an engine retarder or regenerative braking of the vehicle should be engaged at a first position, and disengaged a second position specified.

The cruise control system 110 may use an operational scheme to determine the predicted speeds 406, the following distances 410, and operations of the vehicle along the upcoming segment of road. The operational characteristics include at least some characteristics selected from engine torque, retarder torque, hybrid motor torque, transmission gear, and neutral coasting, and may include other characteristics. The cruise control system 110 uses the operational scheme to select appropriate settings for the operational characteristics of the vehicle to determine an energy-efficient strategy to navigate the upcoming segment of road while maintaining a safe and efficient following distance to the adjacent vehicle ahead that reduces aerodynamic drag that the vehicle experiences.

The operational scheme may be embodied as logic or executable instructions stored in the memory 114 that define a set of rules for generating predicted speeds, following distances, and operational characteristics for energy efficient operation and control of the associated vehicle while traveling in the platoon. The operational scheme may include a first scheme for navigating an incline grade, as described below with respect to FIG. 5; a second scheme for navigating a decline grade, as described with respect to FIG. 6; and a third scheme for encountering a fellow vehicle ahead traveling at a lower rate of speed than one or more of the plurality of vehicles. Each scheme involves generating predicted speed trajectory information for causing the associated vehicle to perform operations, such as coasting, transmission shifting, or maintaining a defined following distance, at certain times relative to a condition detected. The operational schemes enable the vehicles operated by a cruise control system 110 described herein to concurrently achieve the efficiency benefits of predictive cruise control and the autonomy benefits of adaptive cruise control.

To generate the predicted speed trajectory information 400b, the cruise control system 110 obtains speed trajectory information from one or more vehicles of the platoon, and obtains terrain information regarding the upcoming segment from, e.g., a satellite 118 or a ground-based antenna. In some embodiments, the cruise control system 110 may obtain the terrain information from an on-board database or memory located on the vehicle that electronically stores geographic information regarding, e.g., road routes, elevation, road number, profile, etc. Terrain information stored in the on-board database or memory may be updated using wireless communication systems of the vehicle or via a user communication device (e.g., mobile device) electronically connected to the vehicle. The terrain information may be accessed using location information of the vehicle (e.g., GPS coordinates) and/or navigation information to indicate the region for which terrain information is to be obtained. A non-limiting example of such on-board databases is Continental eHorizon; however, other on-board data storage technologies may be implemented without departing from the scope of the present disclosure.

Non-limiting examples of information in the speed trajectory information received from other vehicles may include predicted maximum speeds, predicted speeds, following distances, and/or operational characteristics of the other vehicle for the upcoming segment. In some situations, the cruise control system 110 may obtain information regarding traffic conditions of the upcoming segment, which may include information indicating that a fellow vehicle or a plurality of fellow vehicles ahead of the platoon is traveling at a slower speed than the lead vehicle of the platoon.

The cruise control system 110 may implement an operational scheme that corresponds to features indicated for the upcoming segment of road in connection with determining the predicted speed trajectory information of the vehicle. As an example, for terrain information indicating that the upcoming segment includes a decline grade, the cruise control system 110 may generate predicted speeds and following distances of the vehicle that prioritize coasting over reduction of aerodynamic drag. As another example, for terrain information indicating that the upcoming segment includes an incline grade, the cruise control system 110 may generate predicted speeds, following distances, and other vehicle control information to prioritize efficient navigation of the platoon as a whole along the incline grade. As a further example, for information indicating that a fellow vehicle ahead of the platoon is traveling at a slower speed than the lead vehicle of the platoon, the cruise control system 110 may generate predicted speeds, following distances, and other vehicle control information to prioritize coasting or energy recovery (e.g., via regenerative braking) on approach to the fellow vehicle. The cruise control system 110 may implement other operational schemes based on other features identified for the upcoming segment, such as road curvature and road hazards.

Figure 5:
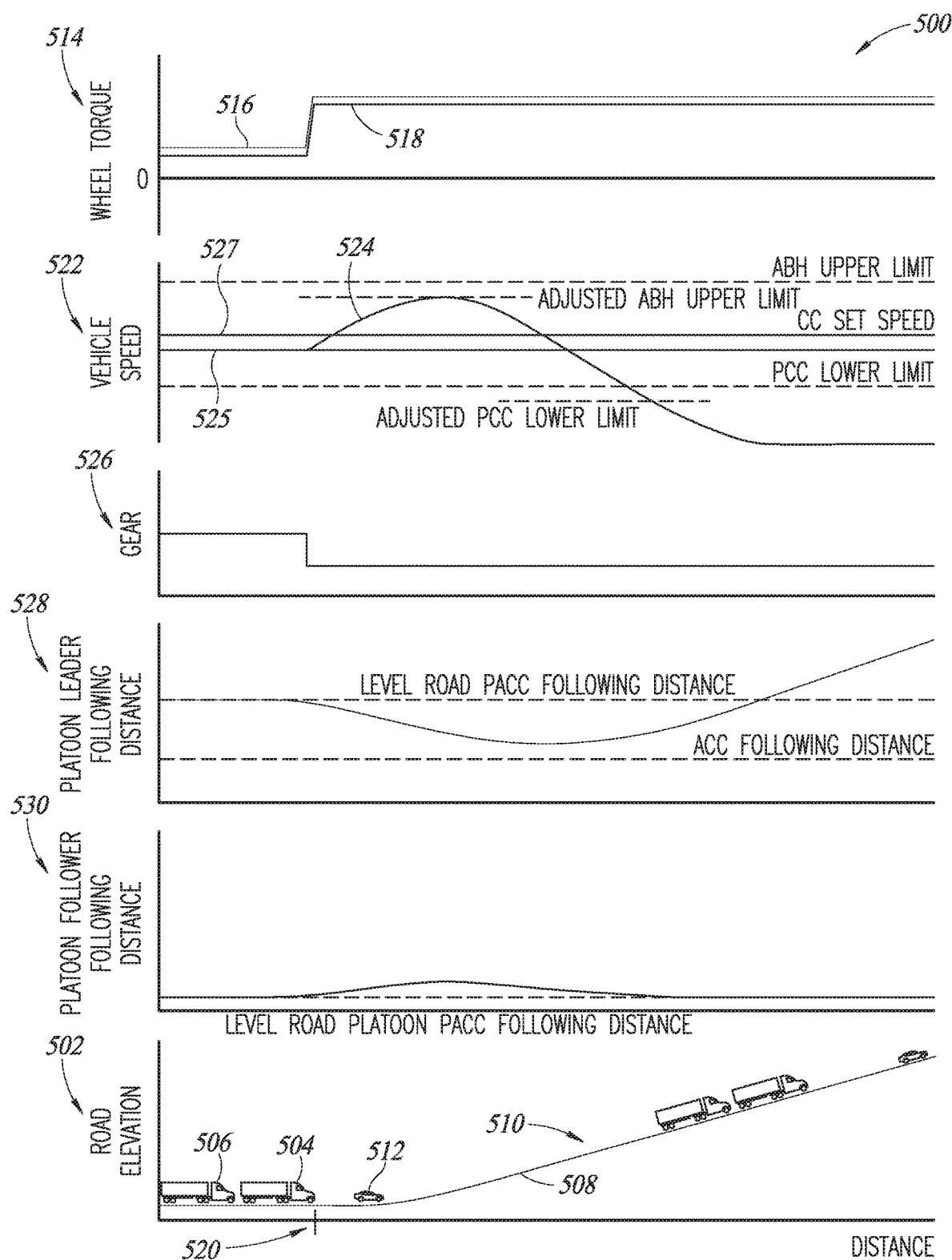
FIG. 5 is a diagram of a plurality of vehicles implementing predictive adaptive cruise control along a segment of road that includes an incline grade condition.

FIG. 5 shows a diagram 500 depicting operation of a plurality of vehicles traveling as a platoon and implementing a predictive adaptive cruise control technique disclosed herein along a segment of road that includes an incline grade. The diagram 500 includes a side view representation 502 of a lead vehicle 504 and a following vehicle 506 of the platoon traveling along a road segment 508 that includes an incline grade 510. Although the representation 502 shows a single following vehicle 506, the platoon may include a plurality of following vehicles operating according to one or more of the predictive adaptive cruise control techniques disclosed herein. The representation 502 also includes a fellow vehicle 512 adjacent to and ahead of the lead vehicle 504.

The diagram 500 includes a plurality of graphical representations indicating operation of vehicles of the platoon based on predicted speed trajectory information generated by a cruise control system 110 according to a predictive adaptive cruise control technique, as described herein. The predicted speed trajectory information is generated as a result of determining that the road segment 508 includes the incline grade 510 having an elevation that increases in a direction along which the platoon is traveling. Prior to reaching the road segment 508, the cruise control systems 110 of the platoon obtain terrain information indicating that the road segment 508 includes the incline grade 510.

The cruise control systems 110, as a result of identifying the upcoming incline grade 510, implement an operational scheme in which operation of the vehicles during the road segment 508 will be controlled to emphasize certain benefits of predictive adaptive cruise control described herein. In particular, the cruise control systems 110 determine the predicted speeds, following distances, and operational characteristics of the vehicles for the road segment 508 to emphasize the benefits of predictive adaptive speed control to prevent or minimize downshifting and reduce or mitigate the sag in speed experienced by the platoon while traveling up the incline grade 510. The predicted speed trajectory information causes the corresponding cruise control systems 110 of the lead vehicle 504 and the following vehicle 506 to operate as shown in the representations of the diagram 500 and as described below.

The operational scheme implemented for generating predicted speed trajectory information of the platoon traveling along the road segment 508 that includes the incline grade 510 is generally described as follows, but will be more specifically described below. When the platoon of vehicles approaches the incline grade 510, the predicted speed trajectory information causes the cruise control system 110 to shift the selected transmission gear of the vehicle, and accelerate before reaching the incline grade 510. This operation may facilitate prevention of downshifting on the incline grade 510 and reduce a sag in speed experienced by the vehicle while climbing the incline grade 510. The cruise control system 110 of the platoon follower 506 (and of the successive platoon followers thereto) independently determines a position along the road segment 508 at which to shift a selected transmission gear and accelerate based on the predicted speed trajectory information received from the adjacent vehicle ahead.

The diagram 500 shows a representation 514 of motive power output of the lead vehicle 504 and the following vehicle 506 at positions along the road segment 508. The representation 514 is expressed as wheel torque in the diagram 500; however, different or additional metrics for engine power output may be implemented without departing from the scope of the present disclosure. The predicted speed trajectory information generated by the cruise control systems 110 may include information that causes the cruise control systems 110 to operate the associated vehicle according to the representation 514. Specifically, the representation 514 includes a power output profile 516 of the lead vehicle 504 and a power output profile 518 of the following vehicle 506.

According to the power output profile 516, the lead vehicle 504 operates at a first power output level while approaching the incline grade 510 on the road segment 508 and transitions to a second power output level greater than the first power output level at a position 520 along the road segment 508 at a position proximate to the beginning of the incline grade 510. According to the power output profile 518, the following vehicle 506 operates at a third power output level while approaching the incline grade 510 on the road segment 508 and transitions to a fourth power level greater than the third power output level at the position 520 along the road segment 508 at a position proximate to the beginning of the incline grade 510. As shown in the diagram 500, the first power output level may be greater than the third power output level, and the second power output level may be greater than the fourth power output level.

The diagram 500 shows a representation 522 of vehicle speed of the lead vehicle 504 and the following vehicle 506 along the road segment 508. The predicted speed trajectory information includes information that causes the cruise control systems 110 of the lead vehicle 504 and the following vehicle 506 to operate the associated vehicle according to the representation 522. In particular, the predicted speeds 406 (FIG. 4B) of the predicted speed trajectory information 400b for the lead vehicle 504 and the following vehicle 506 have a trend corresponding to a speed profile 524 shown in the representation 522.

For the road segment 508 including the incline grade 510, the platoon is traveling at a relatively constant speed, which may be a speed 525 of the fellow vehicle 512 or a cruise control set speed 527 of the platoon (CC SET SPEED shown in FIG. 5). The speed profile 524 indicates that the vehicle speed of the platoon accelerates before reaching the incline to a certain speed—the Accelerate Before Hill (ABH shown in FIG. 5) upper limit—which may be determined based on a maximum predicted speed for the platoon and following distance error of the vehicles. The speed of the platoon decreases as the platoon ascends the incline grade 510.

The diagram 500 also includes a representation 526 of a transmission gear selection for the vehicles of the platoon while traveling along the road segment 508. The predicted speed trajectory information for the lead vehicle 504 and the following vehicle 506 correspond to the representation 526 shown. In particular, the predicted speed trajectory information causes the cruise control systems 110 to engage or maintain transmissions of the lead vehicle 504 and the following vehicle 506 in a first transmission gear when approaching the incline grade 510. Then, at the position 520, the predicted speed trajectory information causes the cruise control systems 110 to downshift the transmissions of the lead vehicle 504 and the following vehicle 506 to a second transmission gear lower than the first transmission gear.

The speed profile 524 may be achieved by the cruise control systems 110 of the lead vehicle 504 and the following vehicle 506 as a result of implementing the predicted speed trajectory information corresponding to the representation 514 and the representation 526.

The diagram 500 includes a representation 528 of following distance of the lead vehicle 504 to the fellow vehicle 512 along the road segment 508. The representation 528 shows a following distance profile for the lead vehicle 504 that corresponds to the following distances 410 in the predicted speed trajectory information 400b generated by a cruise control system 110 of the lead vehicle 504, as discussed with respect to FIG. 4 and elsewhere herein.

The diagram 500 also includes a representation 530 of following distance of the following vehicle 506 to the lead vehicle 504 along the road segment 508. The representation 530 shows a following distance profile for the following vehicle 506 that corresponds to the following distances 410 in predicted speed trajectory information 400b generated by a cruise control system 110 of the following vehicle 506.

In the operational scheme described with respect to the diagram 500, the fellow vehicle 512 is travelling at a substantially constant speed along the road segment 508 that includes the incline grade 510. The cruise control systems 110 of the platoon may modify the speed trajectory information respectively implemented for the vehicles of the platoon based on deviation from the predicted speed trajectories. For example, the cruise control system 110 of the lead vehicle 504 may detect that the distance to the fellow vehicle 512 is less than a predicted following distance for one or more positions along the road segment 508. The cruise control system 110 may generate new predicted speed trajectory information for the lead vehicle 504 to attain the desired following distance profile shown in the representation 528, and transmit the new predicted speed trajectory information to the following vehicle 506. The cruise control systems 110 of the following vehicles 506 may then update their predicted speed trajectory information in response.

Figure 6:
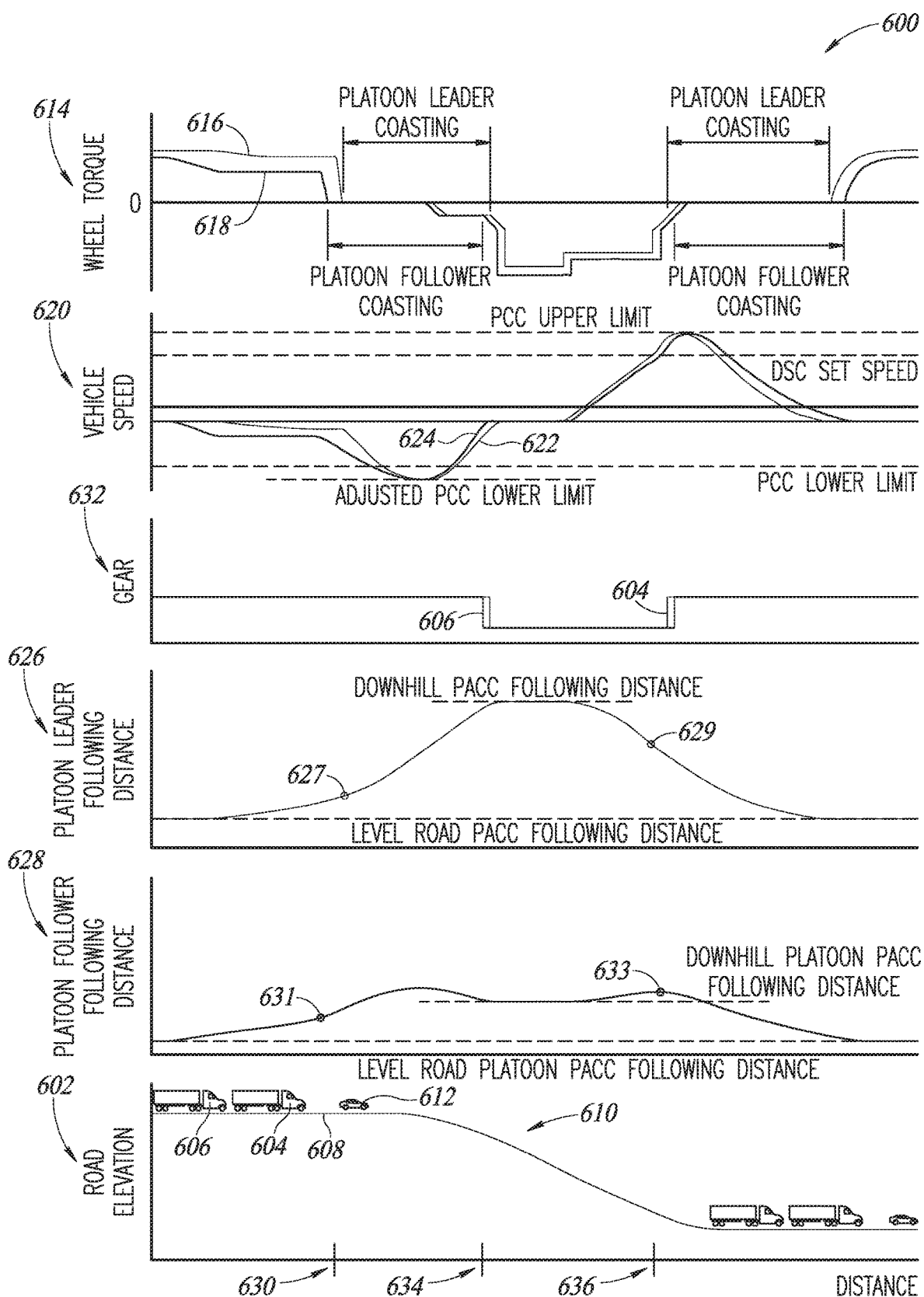
FIG. 6 is a diagram of a plurality of vehicles implementing predictive adaptive cruise control along a segment of road that includes a decline grade condition.

FIG. 6 shows a diagram 600 depicting operation of the plurality of vehicles traveling as a platoon and implementing one or more predictive adaptive cruise control techniques disclosed herein along a segment of road that includes a decline grade. The diagram 600 includes a side view representation 602 of a lead vehicle 604 and a following vehicle 606 of the platoon traveling along a road segment 608 that includes a decline grade 610. Although the representation 602 shows a single following vehicle 606, the platoon may include a plurality of following vehicles operating according to one or more predictive adaptive cruise control techniques disclosed herein. The representation 602 also includes a fellow vehicle 612 adjacent to and ahead of the lead vehicle 604.

The diagram 600 includes a plurality of graphical representations indicating operation of the platoon vehicles based on predicted speed trajectory information generated by the cruise control systems 110. The predicted speed trajectory information is generated as a result of determining that the road segment 608 includes the decline grade 610 having an elevation that decreases in a direction along which the platoon is traveling. Prior to reaching the road segment 608, the cruise control systems 110 of the platoon obtain terrain information indicating that the road segment 608 includes the decline grade 610.

The cruise control systems 110, as a result of identifying the upcoming decline grade 610, implement an operational scheme in which operation of the platoon vehicles during the road segment 608 will be controlled to emphasize certain benefits of predictive adaptive cruise control described herein. In particular, the cruise control systems 110 determine the predicted speeds, following distances, and operational characteristics of the vehicles for the road segment 608 to emphasize the benefits of predictive adaptive speed control by prioritizing coasting of at least some of the platoon vehicles over the reduction in aerodynamic drag caused by drafting while traveling down the decline grade 610. The predicted speed trajectory information causes the corresponding cruise control systems 110 of the lead vehicle 604 and the following vehicle 606 to operate as shown in the representations of the diagram 600 and as described below.

The operational scheme implemented for generating predicted speed trajectory information of the platoon traveling along the road segment 608 that includes the decline grade 610 is generally described as follows, but will be more specifically described below. When the platoon of vehicles approaches the decline grade 610, the predicted speed trajectory information causes the vehicles to begin coasting before reaching the decline grade 610. The predicted speed trajectory information may also cause the vehicles to reduce speed and increase following distance on approach to the decline grade 610. As the vehicles travel down the decline grade 610, the cruise control systems 110 operate the vehicles to maintain a longer following distance relative to a following distance that would be maintained along a level road. The cruise control systems 110 cause the speed of the platoon vehicles to increase as each vehicle approaches the end of the decline grade 610 and coast back to a target speed and desired following distances.

The diagram 600 includes a representation 614 of motive power output of the lead vehicle 604 and the following vehicle 606 at positions along the road segment 608. The representation 614 includes a power output profile 616 of the lead vehicle 604 and a power output profile 618 of the following vehicle 606. The diagram 600 also includes a representation 620 of vehicle speed of the lead vehicle 604 and the following vehicle 606 at positions along the road segment 608. The representation 620 includes a speed profile 622 of the lead vehicle 604 and speed profile 624 of the following vehicle 606. Certain details regarding the diagram 600 are substantially similar to the description provided herein with respect to the diagram 500, so further description thereof is omitted for brevity.

According to the power output profiles 616 and 618, the output power levels of the lead vehicle 604 and the following vehicle 606 decrease along the road segment 608 on approach to the decline grade 610. The output level of the following vehicle 606 may be less than the output level of the lead vehicle 604 on the approach to the decline grade 610. The speeds of the lead vehicle 604 and the following vehicle 606 also decrease along the road segment 608 on approach to the decline grade 610, as shown in the vehicle speed profiles 622 and 624.

The diagram 600 includes a representation 626 of following distances of the lead vehicle 604 to the fellow vehicle 612 ahead along the road segment 608. The diagram 600 further includes a representation 628 of following distances of the following vehicle 606 to the lead vehicle 604 along the road segment 608. The representations 626 and 628 show following distance profiles for the respective vehicles 604 and 606 that correspond to the following distances 410 in the predicted speed trajectory information 400b, as discussed with respect to FIG. 4 and elsewhere herein. According to the representation 626, the following distance of the lead vehicle 604 to the fellow vehicle 612 increases along the road segment 608 on approach to the decline grade 610. The representation 626 shows the pre-downhill coast following distance 627 and the pre-roll-out following distance 629 for the platoon leader 604. According to the representation 628, the following distance of the following vehicle 606 to the lead vehicle 604 also increases along the road segment 608 on approach to the decline grade 610. The representation 628 shows the pre-downhill coast following distance 631 and the pre-roll-out following distance 633 for the platoon follower 606.

At or near a position 630 proximate to and before the decline grade 610 along the road segment 608, the cruise control systems 110 cause the lead vehicle 604 and the following vehicle 606 to begin coasting by decreasing the power output level of the lead vehicle 604 to zero, as shown in the power output profiles 616 and 618. The predicted speed trajectory information of the following vehicle 606 may specify that the following vehicle 606 begins coasting before the position 630 at which the lead vehicle 604 begins coasting. The lead vehicle 604 and the following vehicle 606 are coasting at a zero or below zero power output level when the platoon arrives at and begins descending the decline grade 610.

As shown in the speed profile 622 and the speed profile 624, the speed of the lead vehicle 604 and the following vehicle 606 begin to decrease when coasting is engaged at or near the position 630. When the platoon arrives at and begins descending the decline grade 610, the speed of the lead vehicle 604 and the following vehicle 606 begin to increase. Referring to the representations 626 and 628, the following distance of the lead vehicle 604 and the following vehicle 606 continue to increase when the platoon arrives at and begins descending the decline grade 610. As shown in the representations 626 and 628, the following distances of the be vehicle 604 and the following vehicle 606 are relative to a Level Road Platoon Following Distance, which may correspond to the nominal platoon following distance discussed herein with respect to determination of a following distance error. With further reference to the representation 628, the Downhill Platoon PACC Following Distance may be another defined following distance specified or stored in the memory 114, which the following vehicle 606 reaches while traveling down the decline grade 610. Prior to reaching the beginning of the decline grade 610, the following vehicle 606 may reach a following distance to the lead vehicle 604 greater than the Downhill Platoon PACC Following Distance.

The diagram 600 also includes a representation 632 of a transmission gear selection for the vehicles of the platoon while traveling along the road segment 608. The predicted speed trajectory information for the lead vehicle 604 and the following vehicle 606 correspond to the representation 632 shown. In particular, the predicted speed trajectory information causes the cruise control systems 110 to engage or maintain transmissions of the lead vehicle 604 and the following vehicle 606 in a first transmission gear when approaching and beginning descent down the decline grade 610.

At a position 634 along the decline grade 610, the transmission of the lead vehicle 604 is downshifted from the first transmission gear to a second transmission gear lower than the first transmission gear. The following vehicle 606 may downshift the transmission gear before the lead vehicle 604 downshifts based on the predicted speed trajectory information received from the lead vehicle 604. By downshifting, the following distances of the lead vehicle 604 and the following vehicle 606 to the vehicles ahead can be maintained within desired following distance ranges. In some embodiments, the lead vehicle 604 and/or the following vehicle 606 may engage an engine retarder instead of or in connection with downshifting the transmission. In some embodiments, the lead vehicle 604 and/or the following vehicle 606 may include regenerative braking features that are operable to store kinetic energy of the respective vehicle, e.g., as stored kinetic energy in a flywheel-storage power system, or convert and store the kinetic energy in a different form, such as electrical energy to be stored in batteries of the vehicle. In such implementations, the vehicle may engage regenerative braking instead of or in connection with downshifting at or near the position 634.

The speed of the lead vehicle 604 and the following vehicle 606 may continue to increase down the decline grade 610 past the position 634, as shown in the speed profiles 622 and 624. At a position 636 near the bottom of the decline grade 610, the transmission of the lead vehicle 604 is upshifted back to the first transmission gear. The transmission of the following vehicle 606 is also upshifted back to the first transmission gear at the position 636 or a position shortly thereafter on the decline grade 610. In implementations where the vehicle includes an engine retarder or regenerative braking, such features are disengaged or reduced and load at the position 636 or the position shortly thereafter. The lead vehicle 604 and the following vehicle 606 also begin coasting again at or shortly after the position 636 near the bottom of the decline grade and decrease in speed to return to a target speed and desired following distances.

As shown in the representation 626, the following distance of the lead vehicle 604 to the fellow vehicle 612 begins to decrease before the position 636 and along the remainder of the decline grade 610. The following distance of the following vehicle 606 to the lead vehicle 604 begins to decrease around the position along the decline grade 610 at which the following vehicle 606 begins coasting, as shown in the representation 628. While descending the incline grade 610 (e.g., between the positions 630 and 636), the following distance of the lead vehicle 604 and/or the following distance of the following vehicle 606 may increase to a distance sufficient to reduce or eliminate the energy efficiency benefits of drafting. The cruise control system 110 of the following vehicle 606 may reach the pre-roll-out following distance 633 at the position 636 on approach to the end of the decline grade 610. However, as a result of the foregoing operation of the platoon determined based on an operational scheme for navigating decline grades according to a predictive adaptive cruise control technique disclosed herein, the vehicles of the platoon achieve energy efficiency benefits for coasting and potentially for regenerative braking that are greater than the energy efficiency benefits of drafting.

In the operational scheme described with respect to the diagram 600, the fellow vehicle 612 is travelling at a substantially constant speed along the road segment 608 that includes the decline grade 610. The cruise control systems 110 of the platoon may modify the speed trajectory information respectively implemented for the vehicles of the platoon based on deviation from the predicted speed trajectories. For example, the cruise control system 110 of the lead vehicle 604 may detect that the distance to the fellow vehicle 612 is greater than a predicted following distance for one or more positions along the road segment 608. The cruise control system 110 may generate new predicted speed trajectory information for the lead vehicle 604 to attain the desired following distance profile shown in the representation 626, and transmit the new predicted speed trajectory information to the following vehicle 606. The cruise control systems 110 of the following vehicles 606 may then update their predicted speed trajectory information in response.

Figure 7:
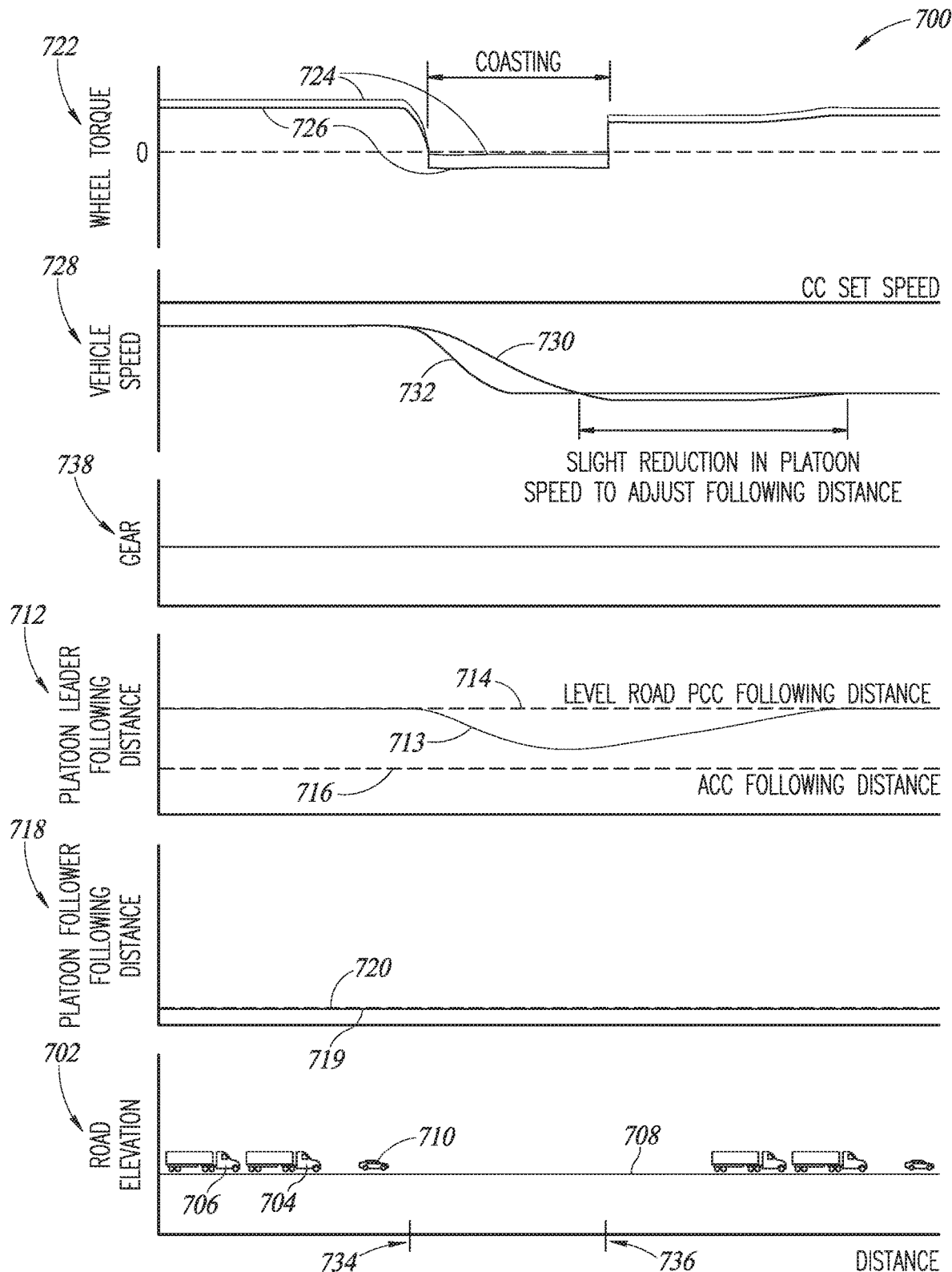
FIG. 7 is a diagram of a plurality of vehicles implementing predictive adaptive cruise control along a segment of road that includes a fellow vehicle ahead of the plurality of vehicles.

FIG. 7 shows a diagram 700 depicting operation of the plurality of vehicles traveling as a platoon and implementing one or more predictive adaptive cruise control techniques disclosed herein along a segment of road that includes a fellow vehicle. The diagram 700 includes a side view representation 702 of a lead vehicle 704 and a following vehicle 706 of the platoon traveling along a road 708. The diagram 700 also includes a fellow vehicle 710 ahead of the lead vehicle 704. In a first portion of the representation 702, the fellow vehicle 710 is detected as having a speed matching a speed of the lead vehicle 704. In a second portion of the representation 702, the fellow vehicle 710 is detected as traveling at a lower rate of speed than one or more vehicles of the platoon. The cruise control systems 110 operate to maintain a desired or defined following distance to an adjacent vehicle ahead in response to detection of the decrease in speed of the fellow vehicle 710, as described below in greater detail. Although the representation 702 shows a single following vehicle 706, the platoon may include a plurality of following vehicles operating according to a predictive adaptive cruise control technique disclosed herein.

The diagram 700 includes a plurality of graphical representations indicating operation of the platoon vehicles based on predicted speed trajectory information generated by the cruise control systems 110. The predicted speed trajectory information is generated as a result of detecting that the following distance of the lead vehicle 704 to the fellow vehicle 710 is below a defined threshold for the predictive adaptive cruise control technique disclosed herein that is being implemented by the platoon. While traveling along the road 708, the cruise control systems 110 of the following vehicle 706 and the lead vehicle 704 communicate speed trajectory information with each other, as described herein.

As a result of detecting that the following distance of the lead vehicle 704 to the fellow vehicle 710 is less than a defined threshold, the cruise control system 110 of one or more platoon vehicles may implement an operational scheme in which operation of the platoon vehicle(s) will be controlled to emphasize certain benefits of predictive adaptive cruise control disclosed herein. In particular, the cruise control system 110 determines the predicted speeds, following distances, and operational characteristics of the vehicle to achieve the energy efficiency benefits of coasting or regenerative braking in addition to the energy efficiency benefits of drafting while traveling along the road 708. The road 708 shown is a segment of level road with insignificant variation in elevation.

While traveling along the road 708, the cruise control system 110 of the lead vehicle 704 obtains a plurality of distance measurements by the one or more sensors 120, the distance measurements indicating a distance of the lead vehicle 704 to the fellow vehicle 710. Based on the distance measurements, the cruise control system 110 of the lead vehicle 704 may determine a speed of the fellow vehicle 710 and generate predicted speed trajectory information 400b that will not violate the minimum following distance with the fellow vehicle 710.

The diagram 700 includes a representation 712 of following distances 713 of the lead vehicle 704 to the fellow vehicle 710. The cruise control system 110 of the lead vehicle 704 generates following distance information to maintain a defined following distance 714 to the fellow vehicle 710. The defined following distance 714 is greater than a minimum following distance 716 typically implemented according to adaptive cruise control techniques to maintain a safe distance to the vehicle ahead. The diagram 700 also includes a representation 718 of following distances 719 (represented by a solid line in FIG. 7) of the following vehicle 706 to the lead vehicle 704. The cruise control system 110 of the following vehicle 706 generates following distance information to maintain a defined following distance 720 (represented by a dashed line in FIG. 7) to the lead vehicle 704. The following distance 719 in FIG. 7 is substantially similar to the defined following distance 720; however, the following distance 719 may diverge from the defined following distance 720 in some circumstances, such as in response to detection of the decline grade 610 ahead of the platoon. The defined following distance 720 for the following vehicle 706 may be a shorter distance than the defined following distance 714, to reduce aerodynamic drag.

The defined following distance 714 may be defined in the memory 114 for level road segment with insignificant changes in elevation. In some embodiments, the defined following distance 714 may be a following distance of a plurality of defined following distances that individually correspond to a road grade. The plurality of defined following distances may be stored in a data structure, such as a lookup table, in association with the corresponding road grade. The cruise control system 110 may determine which defined following distance 714 to implement based on the terrain information for the segment of road. For instance, the cruise control system 110 may select, for a decline grade condition having a particular slope indicated in the terrain information, a corresponding defined following distance 714 that is greater than a defined following distance for a level road segment.

The diagram 700 includes a representation 722 of motive power output of the lead vehicle 704 and the following vehicle 706 at positions along the road 708. The representation 722 includes a power output profile 724 of the lead vehicle 704 and a power output profile 726 of the following vehicle 706. The diagram 700 also includes a representation 728 showing a speed profile 730 of the vehicles of the platoon and a speed profile 732 of the fellow vehicle 710. The diagram 700 also includes a representation 738 of a transmission gear selection for the vehicles of the platoon while traveling along the road segment 708. The predicted speed trajectory information for the lead vehicle 704 and the following vehicle 706 correspond to the representation 738 shown. In particular, the predicted speed trajectory information causes the cruise control systems 110 to engage or maintain transmissions of the lead vehicle 704 and the following vehicle 706 in a first transmission gear.

As shown in the representation 722, the power output levels of the lead vehicle 704 and the following vehicle 706 are constant prior to a position 734 along the road 708. As shown in the representation 728, the speed profiles 730 and 732 respectively of the platoon vehicles and the fellow vehicle 710 match prior to the position 734. At the position 734 along the road 708, the cruise control system 110 of the lead vehicle 704 detects a decrease in speed of the fellow vehicle 710 based on distance measurements by the one or more sensors 120 indicating a decrease in following distance of the lead vehicle 704 to the fellow vehicle 710. In particular, at the position 734, the following distance 713 of the lead vehicle 704 drops below the defined following distance 714.

In response to the following distance 713 decreasing below the defined following distance 714, the cruise control system 110 causes the lead vehicle 704 to begin coasting by reducing the power output of the lead vehicle 704 to zero or below zero, as shown in the representation 722. The cruise control system 110 may cause the lead vehicle to begin coasting by, for example, decreasing engine power output, disengaging the transmission input clutch, and/or activating regenerative braking of the lead vehicle 704. The cruise control system 110 of the lead vehicle 704 also generates predicted speed trajectory information for the road 708 indicating predicted speeds and following distance of the lead vehicle 704 for a segment of the road 708 after the position 734. The predicted speeds of the lead vehicle 704 for the segment of the road 708 after the position 734 may correspond to the speed profile 730 shown in the representation 728. The predicted speeds of the following vehicle 706 for the segment of the road 708 after the position 734 may be similar to the predicted speeds of the lead vehicle 704. In some implementations, the predicted speed indicated in predicted speed trajectory information for one or more following vehicles 706 may decrease below the predicted speed of the lead vehicle 704 for a portion of the segment of road 708 to regain the defined following distance 720. The following distances of the lead vehicle 704 for the segment of road 708 after the position 734 may correspond to the profile of following distances 713 shown in the representation 712.

The cruise control system 110 of the lead vehicle 704 transmits the predicted speed trajectory information to the following vehicle 706. The cruise control system 110 of the following vehicle 706 generates predicted speed trajectory information based on the information received from the lead vehicle 704. The cruise control system 110 of the following vehicle 706, in connection with generating the predicted speed trajectory information, determines whether to cause the following vehicle 706 to coast to maintain a desired following distance to the lead vehicle 704. The desired following distance may be the defined following distance 720 shown in the diagram 700. If the cruise control system 110 decides to implement coasting for the following vehicle 706, the cruise control system 110 may further determine the level of regenerative braking needed to maintain the desired following distance.

As shown in the power output profile 726, the predicted speed trajectory information for the following vehicle 706 causes the cruise control system 110 of the following vehicle 706 to begin coasting by reducing the power output of the following vehicle 706 to below zero at or shortly after the position 734. The cruise control system 110 may implement coasting by disengaging the transmission input clutch, and/ or activating regenerative braking.

As shown in the speed profile 730, the reduction in power output causes the speed of the lead vehicle 704 to reduce and keep following distance of the lead vehicle 704 above the minimum following distance 716. Over a period of time, the following distance of the lead vehicle 704 begins to increase and trend toward the defined following distance 714. The speed of the lead vehicle 704 and the following vehicle 706 may reduce below the speed of the fellow vehicle 710 for a short period of time to regain the defined following distance 714.

The cruise control system 110 generates predicted speed trajectory information that causes the lead vehicle to discontinue coasting at a position 736 along the road 708 and increase power output of the lead vehicle 704 based on a determination that the following distance 713 will recover back to the defined following distance 714. The cruise control system 110 of the lead vehicle 704 transmits the predicted speed trajectory information to the following vehicle 706. The cruise control system 110 of the following vehicle 706 generates, based on the information received from the lead vehicle 704, predicted speed trajectory information that causes the following vehicle 706 to discontinue coasting and increase the power output of the following vehicle 706 at the position 736 or a position thereafter. By maintaining a longer following distance, the defined following distance 714 of the lead vehicle 704 to the fellow vehicle 710, the cruise control systems 110 of the vehicle platoon may implement coasting to improve energy efficiency in response to encountering a slowing fellow vehicle 710 ahead. By contrast, other cruise control techniques, such as typical adaptive cruise control, actively slow the vehicle when the following distance of the vehicle drops below the minimum following distance 716. Such active slowing according to other cruise control techniques is typically performed via non-regenerative braking techniques (e.g., engine retarder, service brakes), thereby reducing the efficiency of the vehicle being controlled.

Predictive adaptive cruise control may involve generating speed trajectory information according to two or more operational schemes for a segment of road in which two or more defined features are detected. The cruise control systems 110 may concurrently implement features described with more than one operational scheme based on conditions detected for the segment of road. For example, during operation of a platoon according to the operational scheme described with respect to the diagram 500 along the road segment 508 that includes the incline grade 510, the lead vehicle 504 may determine that the following distance to the fellow vehicle 512 does not match the following distance profile of the representation 528. The cruise control system 110 of one or more of the vehicles in the platoon may, in response, implement features described with respect to the diagram 700 to attain the desired following distance profile along the road segment.

The predictive adaptive cruise control techniques disclosed herein may involve generating speed trajectory information according to operational schemes based on feature of a segment of road, as described with respect to the diagram 500, the diagram 600, and the diagram 700. However, the predictive adaptive cruise control techniques are not restricted to the operational schemes and corresponding road segment features described herein. The predictive adaptive cruise control techniques may involve generating speed trajectory information based on operational schemes and corresponding road segment features other than those described with respect to FIGS. 5, 6, and 7. As a non-limiting example, the predictive adaptive cruise control techniques may involve generating speed trajectory information for road curvatures (e.g., reverse curves, simple curves, deviation curves) based on one or more corresponding operational schemes. As another non-restrictive example, the predictive adaptive cruise control techniques may involve generating speed trajectory information for driving in reduced traction conditions, such as on wet or icy roads, and one or more corresponding operational schemes.

Figure 8:
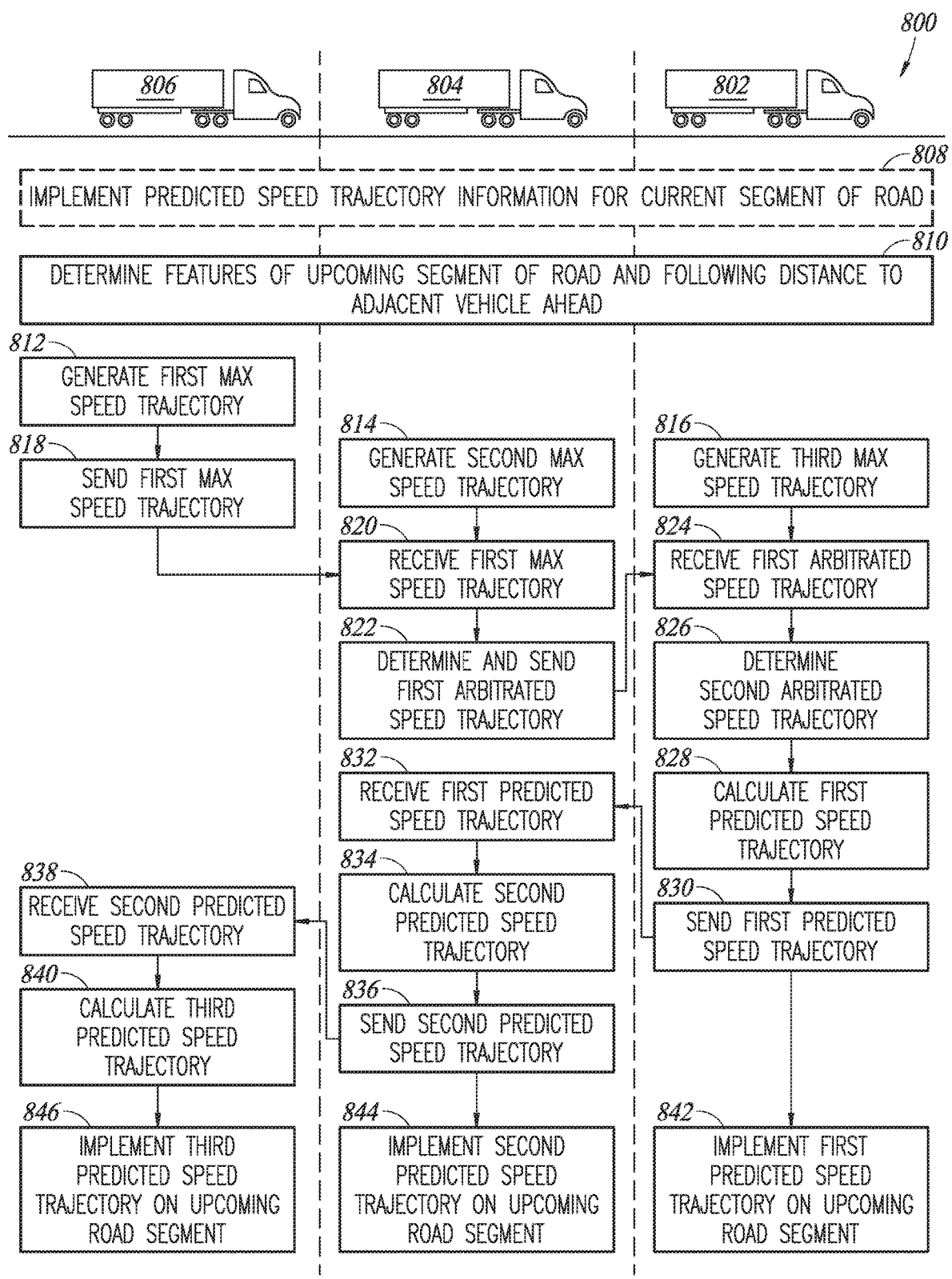
FIG. 8 shows a method for predictive adaptive cruise control according to the first diagram of FIG. 2.

FIG. 8 shows a method 800 for performing the first predictive adaptive cruise control technique described with respect to FIG. 2 according to one or more embodiments. The method 800 may be performed by the cruise control systems 110 of a platoon of vehicles traveling in close succession with each other. In particular, the platoon of vehicles includes a lead vehicle 802, a following vehicle 804 adjacent to and behind the lead vehicle 802, and may include a following vehicle 806 adjacent to and behind the following vehicle 804. The platoon of vehicles may include additional following vehicles adjacent to and behind the following vehicle 806. Prior to or as part of the method 800, the platoon of vehicles may engage in a communication session for wireless communication with each other via the one or more communication interfaces 116. Engaging in a communication session may include exchanging wireless communications with one or more other vehicles according to a communication protocol, such as the Bluetooth® protocol, the ZigBee® protocol, a Wi-Fi® protocol, or a cellular communication protocol, by way of non-limiting example. In connection with engaging in a communication session, the platoon of vehicles may communicate information that indicates the relative positions of the vehicles in the platoon, such as information specifying whether the vehicle is a following vehicle or a lead vehicle.

The method 800 may include implementing 808, by each of the platoon vehicles, predicted speed trajectory information for a current segment of road along which the platoon is traveling. Specifically, the cruise control systems 110 of the platoon of vehicles may be implementing 808 predicted speed trajectory information that was previously determined for the current segment of road, which may include predicted speed, following distance, and/or operational characteristics for each vehicle of the platoon. The method 800 includes determining 810 features of an upcoming segment of road and a following distance to the adjacent platoon vehicle ahead, if such vehicle exists. Determining the features for the upcoming segment of road may include determining a current position of the vehicle or a position of the vehicle at a time in the future, and obtaining terrain information from an onboard database, a satellite 118, or a ground-based network.

The vehicles of the platoon generate, as part of the method 800, predicted maximum speed trajectory information for the upcoming segment of road. In particular, the method 800 includes generating 812 first predicted maximum speed trajectory information of the following vehicle 806 for the upcoming segment of road, generating 814 second predicted maximum speed trajectory information of the following vehicle 804 for the upcoming segment of road, and generating 816 third predicted maximum speed trajectory information of the lead vehicle 802 for the upcoming segment of road. The maximum speed trajectory information generated in 812, 814, and 816 corresponds to the maximum speed trajectory information 400a described with respect to FIG. 4A, so further description thereof is omitted for brevity.

The method 800 includes sending 818, by the cruise control system 110 of the following vehicle 804, the first predicted maximum speed trajectory information generated in 812 to the following vehicle 806. Prior to sending 818 the first predicted maximum speed trajectory information, the cruise control system 110 may correct the first predicted maximum speed trajectory information for following distance error, as described with respect to FIG. 2 and elsewhere herein. For example, the cruise control system 110 of the following vehicle 806 may determine a following distance error corresponding to a difference between a nominal platoon following distance to the following vehicle 804 and a measured following distance to the following vehicle 804. As another example, the following distance error may correspond to a difference between a following distance specified in previously generated speed trajectory information for the following vehicle 806 and a measured following distance to the following vehicle 804. If such following error is detected, the cruise control system 110 of the following vehicle 806 may shift the speed trajectory of the first predicted maximum speed trajectory information by an amount corresponding to the following error. For example, a speed profile of the predicted maximum speeds may be shifted in position along the upcoming segment by a distance corresponding to the following distance error determined.

The method 800 further includes receiving 820, by the following vehicle 804, the first predicted maximum speed trajectory information transmitted by the following vehicle 806 adjacent to and behind the following vehicle 804. The method 800 proceeds by determining 822, by the following vehicle 804 first arbitrated speed trajectory information based on a defined criterion from among the first predicted maximum speed trajectory information generated in 812 and the second predicted maximum speed trajectory information generated in 814. Determining 822 includes selecting, for each position along the upcoming segment of road indicated, a minimum speed between a first maximum speed specified in the first predicted maximum speed trajectory information and a second maximum speed specified in the second predicted maximum speed trajectory information, as described with respect to FIG. 2 and elsewhere herein. The method 800, at 822, also includes compiling, by the following vehicle 804, the minimum speeds for each position along the upcoming segment into first arbitrated speed trajectory information.

Determining 822 may include determining a following distance error, if any, corresponding to at least one difference between a defined following distance and a measured following distance. The defined following distance, in some embodiments, is a nominal platoon following distance stored in the memory 114. In some embodiments, the defined following distance may be a following distance specified in the predicted speed trajectory information implemented by the following vehicle 804 for the current segment. As a result of determining 822 that a following error is present based on a measured following distance to the lead vehicle 802, the cruise control system 110 may shift the speed profile of the maximum speeds specified in the first arbitrated speed trajectory information by a distance corresponding to the following error distance. Determining 822 also includes transmitting the first arbitrated speed trajectory information to the lead vehicle 802.

At 824, the lead vehicle 802 receives the first arbitrated speed trajectory information from the following vehicle 804 and determines 826 second arbitrated speed trajectory information. In particular, the second arbitrated speed trajectory information is determined in 826 by selecting, for each position along the upcoming segment of road indicated, a minimum speed between a first maximum speed specified in the first arbitrated speed trajectory information received in 824 and a second maximum speed specified in the third predicted maximum speed trajectory information generated in 816, as described with respect to FIG. 2 and elsewhere herein. The method 800, at 826, also includes compiling, by the lead vehicle 802, the minimum speeds for each position along the upcoming segment into second arbitrated speed trajectory information.

The method 800 includes generating or calculating 828 first predicted speed trajectory information to be implemented by the lead vehicle 802 during the upcoming segment of road. The first predicted speed trajectory information specifies predicted speeds of the lead vehicle 802 at positions along the upcoming segment. The predicted speeds are calculated based on the terrain of the upcoming segment, such as slope of a grade in the upcoming segment, and/or based on a fellow vehicle ahead. The cruise control system 110 of the lead vehicle 802 may generate the first predicted speed trajectory information based on an operational scheme for navigating an incline grade, navigating a decline grade, and/or reacting to a slowing fellow vehicle in the upcoming segment, as described with respect to FIGS. 5, 6, and 7. The first predicted speed trajectory information may be generated to account and scheme for navigating other features in the upcoming segment.

The first predicted speed trajectory information generated in 828 is constrained by the second arbitrated speed trajectory information determined in 826 such that a predicted speed calculated for each position along the upcoming segment does not exceed an arbitrated speed specified in the second arbitrated speed trajectory information for the position. As a result, the predicted speeds for the lead vehicle 802 do not exceed a maximum capability of any of the following vehicles. The first predicted speed trajectory information for the lead vehicle 802 corresponds to the predicted speed trajectory information 400*b* described with respect to FIG. 4B and elsewhere herein, so further description thereof is omitted for brevity. The method 800 continues at 830 by sending the first predicted speed trajectory information to the following vehicle 804.

The first predicted speed trajectory information is received 832 by the following vehicle 804. The method 800 includes calculating or generating 834 second predicted speed trajectory information of the following vehicle 804 for the upcoming segment of road, as described with respect to FIG. 4B and elsewhere herein. The second predicted speed trajectory information is calculated are generated based on the first predicted speed trajectory information received in 832. The second predicted speed trajectory information may be generated according to an operational scheme for navigating a feature in the upcoming segment, as described with respect to FIGS. 5, 6, and 7. The method 800 includes sending 836 the second predicted speed trajectory information to the following vehicle 806.

At 838, the following vehicle 806 receives the second predicted speed trajectory information from the following vehicle 804. The method 800 also includes calculating or generating 840 third predicted speed trajectory information based on the second speed trajectory information received at 838. The third predicted speed trajectory information is generated as described with respect to the predicted speed trajectory information 400*b* and elsewhere herein.

The respective vehicles of the vehicle platoon then implement the predicted speed trajectories during the upcoming segment. In particular, at 842, the lead vehicle 802 implements the first predicted speed trajectory information while traveling along the upcoming segment of road; at 844, the following vehicle 804 implements the second predicted speed trajectory information while traveling along the upcoming segment of road, and at 846, the following vehicle 806 implements the third predicted speed trajectory information while traveling along the upcoming segment of road. The method 800 may be iteratively performed while traveling along the upcoming segment and beyond.

Figure 9:
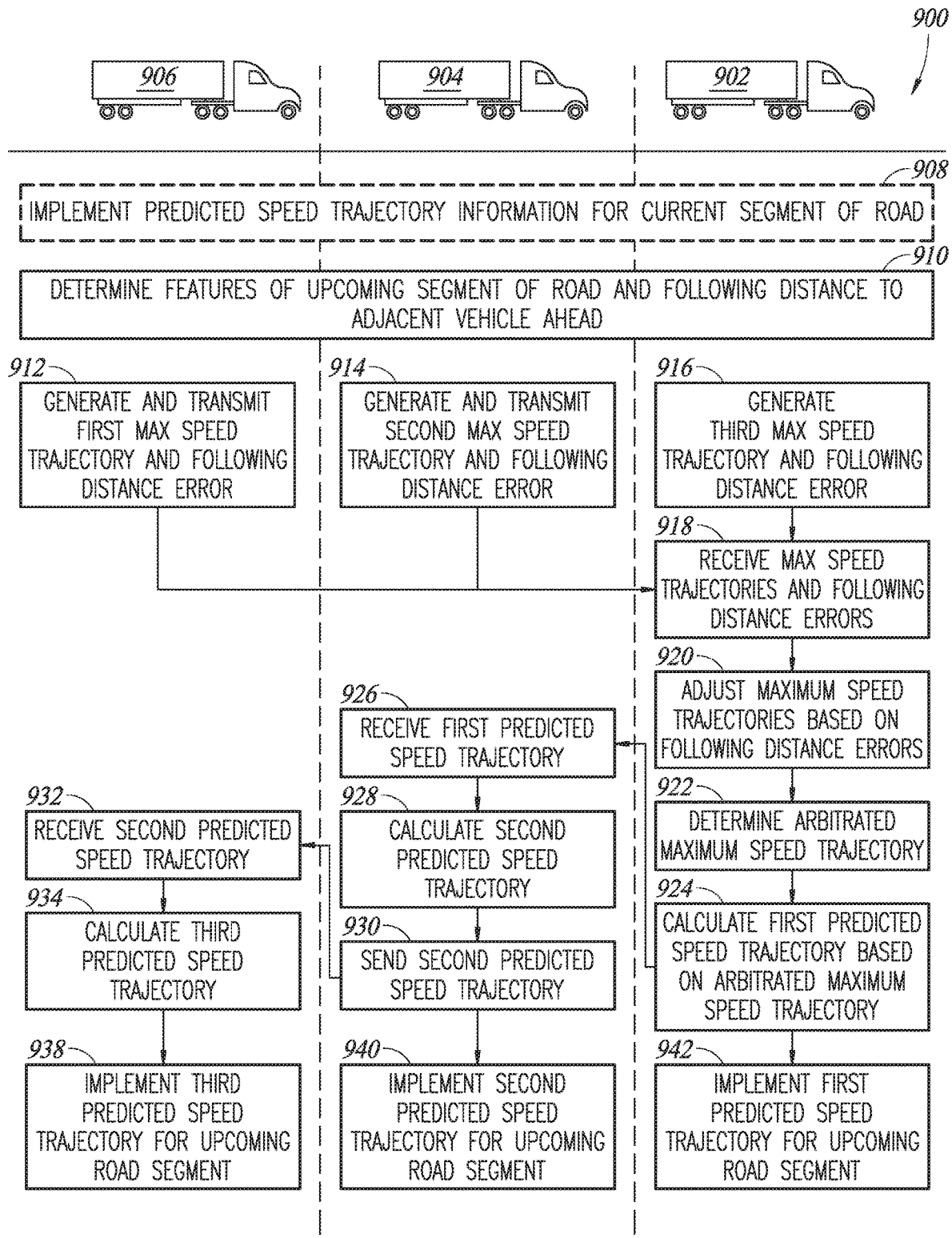
FIG. 9 shows a method for predictive adaptive cruise control according to the second diagram of FIG. 3.

FIG. 9 shows a method 900 for performing the second predictive adaptive cruise control technique described with respect to FIG. 3 according to one or more embodiments. The method 900 may be performed by the cruise control systems 110 of a platoon of vehicles traveling in close succession with each other. In particular, the platoon of vehicles includes a lead vehicle 902, a following vehicle 904 adjacent to and behind the lead vehicle 902, and may include a following vehicle 906 adjacent to and behind the following vehicle 904. The platoon of vehicles may include additional following vehicles adjacent to and behind the following vehicle 906.

Prior to or as part of the method 900, the platoon of vehicles may engage in a communication session for wireless communication with each other via the one or more communication interfaces 116, as described with respect to the method 800 and elsewhere. The method 900 may include implementing 908 predicted speed trajectory information for a current segment of road along which the platoon is traveling, as described with respect to the method 800. The method 900 includes determining 810 features of an upcoming segment of road and a following distance to the adjacent platoon vehicle ahead, if such vehicle exists, as also described with respect to the method 800.

The vehicles of the platoon generate, as part of the method 900, predicted maximum speed trajectory information for the upcoming segment of road. In particular, the method 900 includes generating 912 first predicted maximum speed trajectory information of the following vehicle 906 for the upcoming segment of road and determining following distance error of the following vehicle 906 to the following vehicle 904, as described with respect to 812 of the method 800 and elsewhere. At 912, the first predicted maximum speed trajectory information and the following distance error of the following vehicle 906 are transmitted to the lead vehicle 902.

The method 900 also includes generating 914 second predicted maximum speed trajectory information of the following vehicle 904 for the upcoming segment of road and determining following distance error of the following vehicle 904 to the lead vehicle 902. At 914, the second predicted maximum speed trajectory information and the following distance error of the following vehicle 904 are transmitted to the lead vehicle 902.

The method 900 includes generating 916 third predicted maximum speed trajectory information of the lead vehicle 902 for the upcoming segment of road and following distance error of the lead vehicle 902 to a fellow vehicle ahead. The method 900 continues by receiving 918 the first and second predicted maximum speed trajectory information respectively from the following vehicle 906 and the following vehicle 904. At 920, the cruise control system 110 of the lead vehicle 902 adjusts the speed trajectories of the first predicted maximum speed trajectory information, the second predicted maximum speed trajectory information, and the third predicted maximum speed trajectory information based on the following distance error, if any, for the vehicle corresponding to the trajectory information. Adjusting or shifting maximum speed trajectories based on following distance error is described with respect to FIGS. 2, 8, and elsewhere, so further description thereof is omitted.

The method 900 also includes determining 922 arbitrated maximum speed trajectory information from among the first predicted maximum speed trajectory information, the second predicted maximum speed trajectory information, and the third predicted maximum speed trajectory information based on a defined criterion. For instance, the arbitrated maximum speed trajectory information is determined in 922 by selecting, for each position along the upcoming segment of road indicated, a minimum speed between a first maximum speed specified in the first arbitrated speed trajectory information, a second maximum speed specified in the second predicted maximum speed trajectory information, and a third maximum speed specified in the third predicted maximum speed trajectory information.

At 924, the method 900 includes calculating first predicted speed trajectory information of the lead vehicle 902 that is constrained by the arbitrated maximum speed trajectory determined in 922. The first predicted speed trajectory information is generated or calculated in 924 as described with respect to the predicted speed trajectory information 400b of FIG. 4B and elsewhere. The cruise control system 110 of the lead vehicle 902 may generate the first predicted speed trajectory information based on an operational scheme for navigating an incline grade, navigating a decline grade, and/or reacting to a slowing fellow vehicle in the upcoming segment, as described with respect to FIGS. 5, 6, and 7. The first predicted speed trajectory information is transmitted to the following vehicle 904 by the lead vehicle 902.

The following vehicle 904 receives 926 first predicted speed trajectory information and generates or calculates 928 second predicted speed trajectory information based on the first predicted speed trajectory information received, as described with respect to FIG. 4B, 8, and elsewhere herein. At 930, the second predicted speed trajectory information is sent by the following vehicle 904 to the following vehicle 906.

The method 900 includes receiving 932, by the following vehicle 906, the second predicted speed trajectory information from the following vehicle 904. The following vehicle 906 calculates or generates 934 third predicted speed trajectory information based on the second predicted speed trajectory information received in 932.

The respective vehicles of the vehicle platoon then implement the predicted speed trajectories during the upcoming segment. In particular, at 942, the lead vehicle 902 implements the first predicted speed trajectory information while traveling along the upcoming segment of road; at 940, the following vehicle 904 implements the second predicted speed trajectory information while traveling along the upcoming segment of road, and at 938, the following vehicle 906 implements the third predicted speed trajectory information while traveling along the upcoming segment of road. The method 900 may be iteratively performed while traveling along the upcoming segment and beyond.

The cruise control systems 110 of the vehicle platoon may select, for implementation, the first predictive adaptive cruise control technique of the method 800 or the second predictive adaptive cruise control technique of the method 900 based on characteristics of the platoon. For instance, for a large number of following vehicles, the method 900 may be resource intensive for the cruise control system 110 of the lead vehicle 902 to implement due to the arbitration and following distance error correction. However, the method 900 may reduce transmission delays caused by the series technique of the method 800. As a result, the method 800 may be preferable to implement for a platoon comprising a large number of vehicles. The cruise control systems 110 may be configured to store and transmit information regarding the number of vehicles in the platoon. The cruise control systems 110 may transition between the first predictive adaptive cruise control technique and the second predictive adaptive cruise control technique based on the number of vehicles in the platoon. For example, if the number of vehicles exceeds a defined threshold number of vehicles, the cruise control systems 110 of the platoon may collectively implement the first predictive adaptive cruise control technique of the method 800 and, otherwise the cruise control systems 110 of the platoon may collectively implement the second predictive adaptive cruise control technique of the method 900.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts described herein and shown in the drawings to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
engaging, by a cruise control system of a vehicle, in a vehicle-to-vehicle communication session with a plurality of vehicles travelling in succession; and
during the vehicle-to-vehicle communication session:
obtaining terrain information of an upcoming segment of road on which the plurality of vehicles are travelling;
determining, by the cruise control system of the vehicle, first speed trajectory information including a predicted maximum speed trajectory of the vehicle for the upcoming segment;
transmitting the first speed trajectory information including the predicted maximum speed trajectory of the vehicle to at least one vehicle of the plurality of vehicles that is ahead of the vehicle;
receiving, subsequent to transmission of the first speed trajectory information, second speed trajectory information from an adjacent vehicle of the plurality of vehicles that is immediately ahead of the vehicle, wherein the second speed trajectory information is generated at least partially by the adjacent vehicle based at least partially on the first speed trajectory information;
generating, by the cruise control system of the vehicle, third speed trajectory information based at least partially on the second speed trajectory information and the terrain information, the third speed trajectory information indicating predicted speeds of the vehicle during the upcoming segment; and
controlling operation of the vehicle according to the third speed trajectory information during the upcoming segment.

2. The method of claim 1, comprising:
determining an operational scheme for energy efficient operation of the vehicle along the upcoming segment based at least partially on the terrain information and predicted speeds of the adjacent vehicle specified in the second speed trajectory information for positions along the upcoming segment, wherein the third speed trajectory information is generated based at least partially on the determined operational scheme.

3. The method of claim 2, wherein the determined operational scheme is selected from a plurality of operational schemes that include a first operational scheme for navigating an incline grade, a second operational scheme for navigating a decline grade, and a third operational scheme for a decrease in speed by a fellow vehicle ahead.

4. The method of claim 1, wherein the second speed trajectory information includes a first predicted speed trajectory of the adjacent vehicle for positions along the upcoming segment, and the third speed trajectory information includes a second predicted speed trajectory of the vehicle for the positions along the upcoming segment.

5. The method of claim 1, wherein the at least one vehicle ahead of the vehicle is the adjacent vehicle, the method comprising:
generating fourth speed trajectory information of the vehicle for the upcoming segment based at least partially on terrain information and characteristics of the vehicle; and
receiving, from another vehicle of the plurality of vehicles prior to transmitting the first speed trajectory information, fifth speed trajectory information for the upcoming segment,
wherein determining the first speed trajectory information includes determining, for one or more individual positions along the upcoming segment, a minimum speed among a first speed specified in the fourth speed trajectory information and a second speed specified in the fifth speed trajectory information.

6. The method of claim 1, comprising:
obtaining a measurement, by a sensor of the vehicle, that indicates a detected following distance of the vehicle to the adjacent vehicle; and
determining following distance error of the vehicle to the adjacent vehicle based at least partially on a difference between a nominal platoon following distance and the detected following distance.

7. The method of claim 6, wherein the at least one vehicle ahead of the vehicle is a lead vehicle of the plurality of vehicles, and the predicted maximum speed trajectory of the vehicle for the upcoming segment is determined based at least partially on terrain information and characteristics of the vehicle, the method comprising:
transmitting, in association with the first speed trajectory information, the following distance error to the lead vehicle.

8. A system borne by a vehicle, comprising:
a wireless communication interface;
one or more processors; and
memory coupled to the one or more processors and storing instructions that, as a result of execution by the one or more processors, cause the system to:
engage in a vehicle-to-vehicle communication session with one or more cruise control systems of a plurality of vehicles including the vehicle traveling in succession; and
during the communication session:
obtain terrain information of an upcoming segment of road on which the plurality of vehicles are travelling;
determine first speed trajectory information including a predicted maximum speed trajectory of the vehicle for the upcoming segment;
transmit the first speed trajectory information including the predicted maximum speed trajectory of the vehicle to at least one vehicle of the plurality of vehicles that is ahead of the vehicle;
receive, via the wireless communication interface, second speed trajectory information from an adjacent vehicle of the plurality of vehicles that is immediately ahead of the vehicle, wherein the second speed trajectory information is generated at least partially by the adjacent vehicle based at least partially on the first speed trajectory information;
generate third speed trajectory information based at least partially on the second speed trajectory information and the terrain information, the third speed trajectory information indicating predicted speeds of the vehicle at positions along the upcoming segment; and
control, during the upcoming segment, operation of the vehicle according to the third speed trajectory information.

9. The system of claim 8, wherein execution of the instructions by the one or more processors further causes the system to:
transmit, via the communication interface, the third speed trajectory information to another vehicle of the plurality of vehicles.

10. The system of claim 8, wherein the second speed trajectory information indicates predicted speeds of the adjacent vehicle for positions along the upcoming segment, the third speed trajectory information indicates predicted speeds and following distances of the vehicle at the positions along the upcoming segment, and execution of the instructions by the one or more processors causes the system to control the operation of the vehicle to maintain the following distances to the adjacent vehicle.

11. The system of claim 8, wherein execution of the instructions by the one or more processors further causes the system to:
    determine whether the vehicle is a lead vehicle of the plurality of vehicles or a following vehicle of the plurality of vehicles; and
    as a result of determining that the vehicle is the following vehicle,
        transmit, via the wireless communication interface, the first speed trajectory information to the adjacent vehicle, wherein the second speed trajectory information is received subsequent to transmission of the first speed trajectory information.

12. The system of claim 11, wherein, as a result of determining that the vehicle is the following vehicle, execution of the instructions by the one or more processors further causes the system to:
    generate fourth speed trajectory information of the vehicle for the upcoming segment based at least partially on terrain information and characteristics of the vehicle; and
    receive, from another vehicle of the plurality of vehicles prior to transmission of the first speed trajectory information, fifth speed trajectory information for the upcoming segment,
    wherein determination of the first speed trajectory information includes selecting, for individual positions along the upcoming segment, minimum speeds from among first speeds in the fourth speed trajectory information and second speeds in the fifth speed trajectory information.

13. The system of claim 8, wherein execution of the instructions by the one or more processors further causes the system to:
    determine whether the vehicle is a lead vehicle of the plurality of vehicles or a following vehicle of the plurality of vehicles; and
    as a result of determining that the vehicle is the following vehicle,
        transmit, via the wireless communication interface, the first speed trajectory information to the lead vehicle.

14. The system of claim 13, wherein, as a result of determining that the vehicle is the following vehicle, execution of the instructions by the one or more processors further causes the system to:
    determine following distance error of the vehicle to the adjacent vehicle based at least partially on a difference between a nominal platoon following distance and a detected following distance of the vehicle; and
    transmit, via the wireless communication interface, the following distance error to the lead vehicle.

15. One or more non-transitory computer-readable media storing instructions that, as a result of execution by one or more processors, cause the one or more processors to:
    engage, via a wireless communication interface communicatively coupled to the one or more processors associated with a vehicle, in a communication session with cruise control systems of a plurality of vehicles including the vehicle traveling in succession; and
    during the communication session:
        obtain terrain information of an upcoming segment of road on which the plurality of vehicles are travelling;
        determine first speed trajectory information including a predicted maximum speed trajectory of the vehicle for the upcoming segment;
        transmit the first speed trajectory information including the predicted maximum speed trajectory of the vehicle to at least one vehicle of the plurality of vehicles that is ahead of the vehicle;
        receive, subsequent to transmission of the first speed trajectory information, second speed trajectory information from an adjacent vehicle of the plurality of vehicles that is immediately ahead of the vehicle, wherein the second speed trajectory information is generated at least partially by the adjacent vehicle based at least partially on the first speed trajectory information;
        generate third speed trajectory information based at least partially on the second speed trajectory information and the terrain information, the third speed trajectory information indicating predicted speeds of the vehicle during the upcoming segment, the vehicle associated with the one or more processors; and
        control operation of the vehicle according to the third speed trajectory information during the upcoming segment.

16. The one or more non-transitory computer-readable media of claim 15, wherein execution of the instructions causes the one or more processors to:
    determine that the terrain information indicates an incline grade condition during the upcoming segment, wherein the third speed trajectory information is generated based at least partially on an operational scheme corresponding to the incline grade, the third speed trajectory information including information causing the one or more processors to increase motive power output by the vehicle before reaching the incline grade along the upcoming segment, including information causing the one or more processors to downshift a selected transmission gear of the vehicle, and including information causing the one or more processors to increase following distance of the vehicle to an adjacent vehicle ahead while ascending the incline grade.

17. The one or more non-transitory computer-readable media of claim 15, wherein execution of the instructions causes the one or more processors to:
    determine that the terrain information indicates a decline grade condition during the upcoming segment, wherein the third speed trajectory information is generated based at least partially on an operational scheme corresponding to the decline grade, the third speed trajectory information causing the one or more processors to implement vehicle coasting before reaching the decline grade, including information causing the one or more processors to activate an engine retarder or initiate regenerative braking of the vehicle while traveling along a portion of the decline grade in response to detecting that a measured following distance of the vehicle is less than a defined following distance for the decline grade, and including information causing the one or more processors to implement vehicle coasting before reaching an end of the decline grade.

18. The one or more non-transitory computer-readable media of claim 15, wherein execution of the instructions causes the one or more processors to:
- control a speed of the vehicle to achieve a defined following distance to the adjacent vehicle, the defined following distance being greater than a minimum following distance for adaptive cruise control; and
- detect a decreasing speed trajectory of the adjacent vehicle based at least partially on the second speed trajectory information, wherein the third speed trajectory information is generated based at least partially on an operational scheme corresponding to detection of the decreasing speed trajectory, the third speed trajectory information including information causing the one or more processors to implement vehicle coasting prior to a position in speed trajectory information received from the adjacent vehicle indicating discontinuation of vehicle coasting by the adjacent vehicle.

\* \* \* \* \*